United States Patent
Jeon et al.

(10) Patent No.: US 11,387,877 B2
(45) Date of Patent: Jul. 12, 2022

(54) DEVICE AND METHOD USING ADAPTIVE CODEBOOK FOR DUAL BEAMFORMING FEEDBACK AND WIRELESS COMMUNICATION SYSTEM INCLUDING THE SAME

(71) Applicant: SAMSUNG ELECTRONICS CO., LTD., Suwon-si (KR)

(72) Inventors: Eunsung Jeon, Seoul (KR); Wookbong Lee, San Jose, CA (US); Myeongjin Kim, Seongnam-si (KR); Jonghun Han, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/372,750

(22) Filed: Jul. 12, 2021

(65) Prior Publication Data

US 2022/0103217 A1  Mar. 31, 2022

Related U.S. Application Data

(60) Provisional application No. 63/083,411, filed on Sep. 25, 2020.

(30) Foreign Application Priority Data

Dec. 14, 2020 (KR) .................. 10-2020-0174101

(51) Int. Cl.
- *H04B 7/06* (2006.01)
- *H04L 25/02* (2006.01)
- *H04W 84/12* (2009.01)

(52) U.S. Cl.
CPC ......... *H04B 7/0617* (2013.01); *H04B 7/0639* (2013.01); *H04L 25/021* (2013.01); *H04W 84/12* (2013.01)

(58) Field of Classification Search
CPC ... H04B 7/0617; H04B 7/0639; H04L 25/021; H04W 84/12
(Continued)

(56) References Cited

U.S. PATENT DOCUMENTS

| 8,254,487 B2 | 8/2012 | Tsai et al. |
| 8,576,776 B2 | 11/2013 | Han et al. |
(Continued)

FOREIGN PATENT DOCUMENTS

| EP | 3 637 633 A2 | 4/2020 |
| WO | 2020/094098 A1 | 5/2020 |

OTHER PUBLICATIONS

Communication dated Mar. 1, 2022, issued by the European Patent Office in counterpart European Application No. 21194521.7.

*Primary Examiner* — Fitwi Y Hailegiorgis
(74) *Attorney, Agent, or Firm* — Sughrue Mion, PLLC

(57) ABSTRACT

A beamformee device includes a channel estimator, first and second beamforming matrix providers and a dimension reduction unit. The channel estimator receives a NDP through a channel, and obtains channel information of the channel based on the NDP. The first beamforming matrix provider provides wideband beamforming matrices based on the channel information. The dimension reduction unit generates equivalent channel information based on the wideband beamforming matrices. The second beamforming matrix provider provides beamforming matrices based on the equivalent channel information. The wideband beamforming matrices and the subcarrier beamforming matrices are fed back to the beamformer device. Any one or any combination of the plurality of wideband beamforming matrices and the plurality of subcarrier beamforming matrices are selected from codebooks.

20 Claims, 20 Drawing Sheets

(58) Field of Classification Search
USPC .......................................................... 375/267
See application file for complete search history.

(56) References Cited

U.S. PATENT DOCUMENTS

| | | |
|---|---|---|
| 8,718,157 B2 | 5/2014 | Tosato et al. |
| 9,112,562 B2 | 8/2015 | Li et al. |
| 9,124,328 B2 | 9/2015 | Xia et al. |
| 9,397,738 B2 | 7/2016 | Xu et al. |
| 9,419,765 B2 | 8/2016 | Yu et al. |
| 9,825,680 B2 * | 11/2017 | Yamaura .............. H04B 7/0417 |
| 10,063,299 B2 | 8/2018 | Liu et al. |
| 10,547,362 B2 | 1/2020 | Varatharaajan et al. |
| 2011/0103493 A1 | 5/2011 | Xia et al. |
| 2012/0147985 A1 | 6/2012 | Li et al. |
| 2013/0088981 A1 | 4/2013 | Lv et al. |
| 2019/0372638 A1 | 12/2019 | Lee et al. |
| 2020/0112353 A1 | 4/2020 | Liu |
| 2021/0266054 A1 | 8/2021 | Yu et al. |

* cited by examiner

FIG. 10

| 271 | 272 | 273 | 274b | 275b | 277b |
|---|---|---|---|---|---|
| MAC HEADER | CATEGORY | MIMO CONTROL | CODEBOOK INDEX | COMPRESSED BEAMFORMING REPORT | FEEDBACK MODE |

FIG. 14

| SNR | MCS | FEEDBACK MODE1 | FEEDBACK MODE2 | FEEDBACK MODE3 |
| --- | --- | --- | --- | --- |
| | | DATA RATE | DATA RATE | DATA RATE |
| SNR_1 | MCS_1 | RATE_1_1_1 | RATE_1_1_2 | RATE_1_1_3 |
| | MCS_2 | RATE_1_2_1 | RATE_1_2_2 | RATE_1_2_3 |
| | ⋮ | ⋮ | ⋮ | ⋮ |
| | MCS_M | RATE_1_M_1 | RATE_1_M_2 | RATE_1_M_3 |
| SNR_2 | MCS_1 | RATE_2_1_1 | RATE_2_1_2 | RATE_2_1_3 |
| | MCS_2 | RATE_2_2_1 | RATE_2_2_2 | RATE_2_2_3 |
| | ⋮ | ⋮ | ⋮ | ⋮ |
| | MCS_M | RATE_2_M_1 | RATE_2_M_2 | RATE_2_M_3 |
| ⋮ | ⋮ | ⋮ | ⋮ | ⋮ |
| SNR_K | MCS_1 | RATE_K_1_1 | RATE_K_1_2 | RATE_K_1_3 |
| | MCS_2 | RATE_K_2_1 | RATE_K_2_2 | RATE_K_2_3 |
| | ⋮ | ⋮ | ⋮ | ⋮ |
| | MCS_M | RATE_K_M_1 | RATE_K_M_2 | RATE_K_M_3 |

DEVICE AND METHOD USING ADAPTIVE CODEBOOK FOR DUAL BEAMFORMING FEEDBACK AND WIRELESS COMMUNICATION SYSTEM INCLUDING THE SAME

CROSS-REFERENCE TO RELATED APPLICATIONS

This application claims priority from U.S. Provisional Application No. 63/083,411 filed on Sep. 25, 2020 in the U.S. Patent and Trademark Office, and Korean Patent Application No. 10-2020-0174101 filed on Dec. 14, 2020 in the Korean Intellectual Property Office, the contents of which are herein incorporated by reference in their entireties.

BACKGROUND

1. Field

Methods, apparatuses and systems consistent with example embodiments relate to semiconductor integrated circuits, and more particularly to an adaptive codebook for dual beamforming feedback.

2. Related Art

In a wireless communication system, it is important to have a strong communication signal. In particular, the greatest possible signal-to-noise ratio (SNR) is desired at a receiver end. Similarly, for a wireless fidelity (Wi-Fi) system, an increased SNR at the receiving device increases the probability that frames are correctly received and reduces the amount of retransmissions necessary from the source. SNR at the receiver end may be increased by increasing transmit power, decreasing distance between the source and the receiver, and increasing antenna gain.

A signal can be transmitted based on a beamforming method in a wireless local area network (WLAN) system such as a Wi-Fi system. In a wireless communication system, a beamforming is a technique of a smart antenna, and is a technique for directing a beam to a corresponding terminal. A beamforming feedback should be preceded for a beamforming transmission, and various methods for providing efficient beamforming feedback have been researched.

SUMMARY

At least one example embodiment provides a beamformee device capable of adaptively utilizing a codebook while performing a dual beamforming feedback to reduce the overhead of beamforming feedback.

At least one example embodiment provides a wireless communication system including the beamformee device.

At least one example embodiment provides a beamforming feedback method performed by the beamformee device.

According to an aspect of an example embodiment, a beamformee device includes a processor configured to implement: a channel estimator configured to receive a null data packet (NDP) from a beamformer device through a channel, and to obtain a plurality of channel information associated with a plurality of subcarriers of the channel based on the NDP; a first beamforming matrix provider configured to provide a plurality of wideband beamforming matrices based on the plurality of channel information; a dimension reduction unit configured to generate a plurality of equivalent channel information corresponding to the plurality of channel information based on the plurality of wideband beamforming matrices; and a second beamforming matrix provider configured to provide a plurality of subcarrier beamforming matrices based on the plurality of equivalent channel information. The processor is further configured to feed the plurality of wideband beamforming matrices and the plurality of subcarrier beamforming matrices back to the beamformer device, and any one or any combination of the plurality of wideband beamforming matrices and the plurality of subcarrier beamforming matrices are selected from a plurality of codebooks that are stored in the beamformee device.

According to an aspect of an example embodiment, a wireless communication system includes: a beamformer device configured to transmit an NDP through a channel; and a beamformee device configured to receive the NDP through the channel, to estimate the channel based on the NDP, and to feed a result of estimating the channel back to the beamformer device. The beamformee device includes a processor configured to implement: a channel estimator configured to obtain a plurality of channel information associated with a plurality of subcarriers based on the NDP; a first beamforming matrix provider configured to provide a plurality of wideband beamforming matrices based on the plurality of channel information; a dimension reduction unit configured to generate a plurality of equivalent channel information corresponding to the plurality of channel information based on the plurality of wideband beamforming matrices; and a second beamforming matrix provider configured to provide a plurality of subcarrier beamforming matrices based on the plurality of equivalent channel information. The processor is further configured to feed the plurality of wideband beamforming matrices and the plurality of subcarrier beamforming matrices back to the beamformer device as the result of estimating the channel, and any one or any combination of the plurality of wideband beamforming matrices and the plurality of subcarrier beamforming matrices are selected from a plurality of codebooks that are stored in the beamformee device.

According to an aspect of an example embodiment, a beamformee device includes: a processor configured to implement: a channel estimator configured to receive a null data packet (NDP) from a beamformer device through a channel, and to obtain a plurality of channel information associated with a plurality of subcarriers of the channel based on the NDP; a feedback mode selector configured to select one of a first feedback mode, a second feedback mode or a third feedback mode as a selected feedback mode based on a characteristic of the channel; a first beamforming matrix provider configured to generate a plurality of wideband beamforming matrices by performing a singular value decomposition (SVD) and compressing the plurality of channel information based on the selected feedback mode being the second feedback mode, and to select and output one of a plurality of first codebooks as a selected first codebook based on the plurality of channel information as one of the plurality of wideband beamforming matrices based on the selected feedback mode being the first feedback mode or the third feedback mode; a dimension reduction unit configured to generate a plurality of equivalent channel information corresponding to the plurality of channel information based on the plurality of wideband beamforming matrices; and a second beamforming matrix provider configured to generate a plurality of subcarrier beamforming matrices by performing an SVD and compressing the plurality of equivalent channel information based on the selected feedback mode being the first feedback mode, and to select and output one of a plurality of second codebooks as a selected second codebook based on the plurality of equivalent channel information as one of the plurality of subcarrier beamforming matrices based on the selected feedback mode being the second feedback mode or the third feedback mode. The processor is further configured to feed the plurality of wideband beamforming matrices and the plurality of subcarrier beamforming matrices back to the beamformer device, and a codebook index corresponding to the selected first codebook and the selected second codebook is fed back to the beamformer device.

According to example embodiments, a beamforming feedback method includes: obtaining a plurality of channel information associated with a plurality of subcarriers of a channel based on an NDP that is received from a beamformer device through the channel; providing a plurality of wideband beamforming matrices based on the plurality of channel information; generating a plurality of equivalent channel information corresponding to the plurality of channel information based on the plurality of wideband beamforming matrices; providing a plurality of subcarrier beamforming matrices based on the plurality of equivalent channel information; and feeding the plurality of wideband beamforming matrices and the plurality of subcarrier beamforming matrices back to the beamformer device. Any one or any combination of the plurality of wideband beamforming matrices and the plurality of subcarrier beamforming matrices are selected from a plurality of codebooks that are stored in memory.

According to example embodiments, a beamformee device includes a processor configured to: estimate a channel based on an NDP that is received from a beamformer device through the channel, provide a plurality of wideband beamforming matrices and a plurality of subcarrier beamforming matrices as a result of estimating the channel, select any one or any combination of the plurality of wideband beamforming matrices and the plurality of subcarrier beamforming matrices from a plurality of codebooks that are stored in the beamformee device, generate a beamforming feedback report based on the plurality of wideband beamforming matrices and the plurality of subcarrier beamforming matrices, and feed the beamforming feedback report back to the beamformer device. The beamforming feedback report includes media access control (MAC) header information, category information, multiple-input multiple-output (MIMO) control information, codebook index information, compressed beamforming report (CBR) information, and feedback mode information.

In the beamformee device, the wireless communication system and the beamforming feedback method according to example embodiments, the dual beamforming feedback may be used when the beamforming feedback is performed in the feedback mode, and the codebook utilization scheme may be applied to at least one of the plurality of wideband beamforming matrices and the plurality of subcarrier beamforming matrices. In addition, the adaptive codebook utilization scheme in which the feedback mode is selected and/or changed depending on the condition and/or environment of the channel may be implemented. Accordingly, the feedback overhead of the beamforming feedback may be efficiently reduced, and beamforming feedback may be performed with improved efficiency.

BRIEF DESCRIPTION OF THE DRAWINGS

The above and other aspects will be more apparent from the following description of example embodiments taken in conjunction with the accompanying drawings, in which:

FIG. 10 is a diagram illustrating a beamforming feedback report generated by a beamformee device according to example embodiments.

FIG. 14 is a diagram illustrating a look-up table included in a feedback mode selector according to example embodiments.

DETAILED DESCRIPTION

Figure 1:
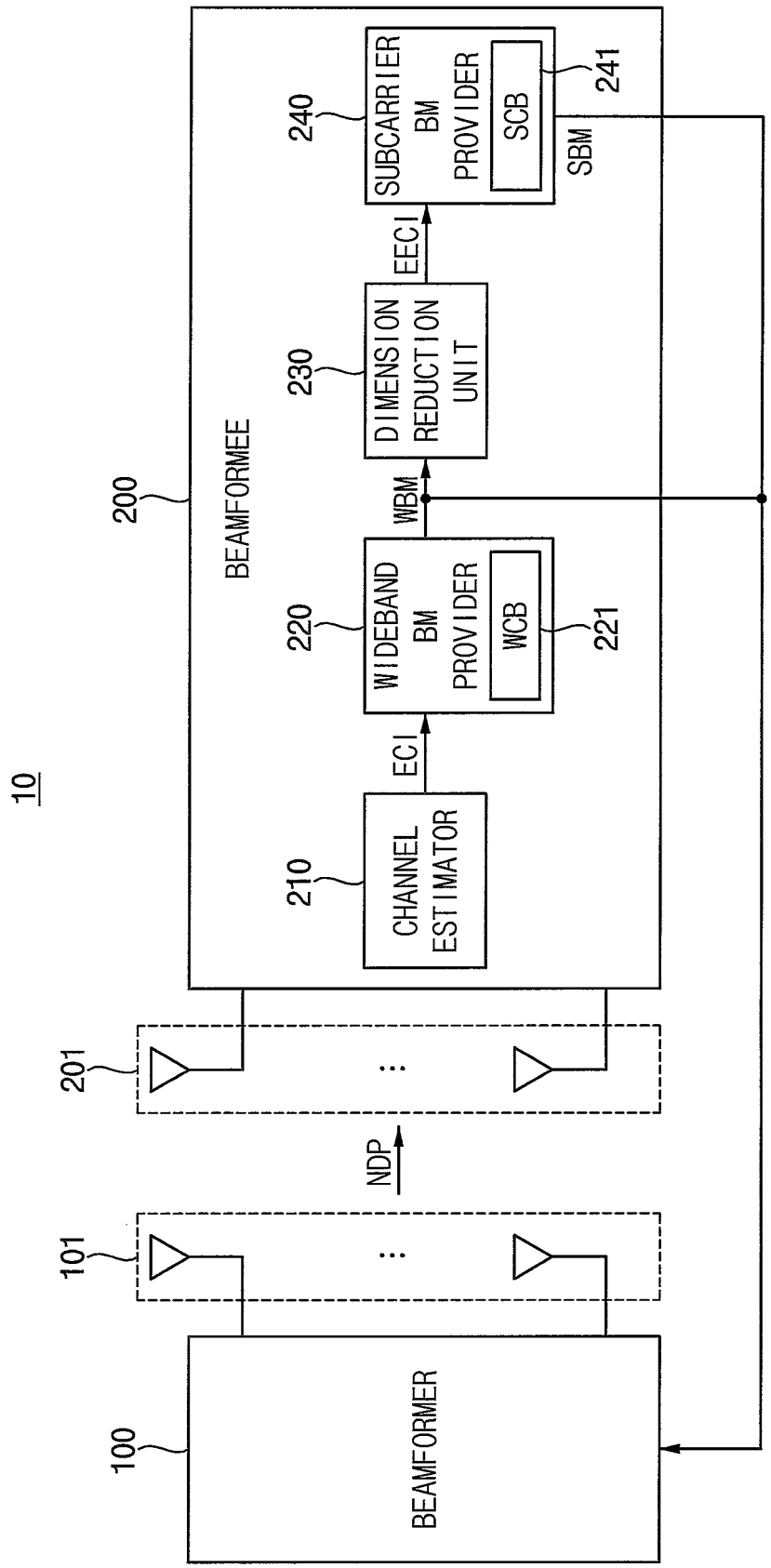
FIG. 1 is a block diagram illustrating a beamformee device and a wireless communication system including the beamformee device according to example embodiments.

Example embodiments will be described with reference to the accompanying drawings. The present disclosure may, however, be embodied in many different forms and should not be construed as limited to the example embodiments set forth herein. Like reference numerals refer to like elements throughout this application. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a block diagram illustrating a beamformee device and a wireless communication system including the beamformee device according to example embodiments.

Referring to FIG. 1, a wireless communication system 10 includes a beamformer device 100 and a beamformee device 200.

In some example embodiments, the wireless communication system 10 may be a wireless communication system that is implemented or formed based on a wireless local area network (WLAN). For example, the wireless communication system 10 may be a wireless communication system that is implemented or formed based on Wi-Fi. For example, the WLAN system may be implemented based on the Institute of Electrical and Electronics Engineers (IEEE) 802.11ac standard or the IEEE 802.11ax standard, or may be implemented based on the IEEE 802.11be standard that is a next generation standard.

In the WLAN system, a beamforming transmission may be performed between the beamformer device 100 and the beamformee device 200. The beamforming transmission is a technology in which a beam of an antenna is directed and limited to a specific terminal in a multi-antenna orthogonal frequency division modulation (OFDM) system. The beamforming transmission may be divided into a technique of forming a transmission beam to increase a reception data rate of a single user (e.g., a single-user beamforming) and a technique of forming a transmission beam for mutual interference cancellation during simultaneous transmission between multiple users (e.g., a multi-user beamforming). The beamformee device 200 may decode a packet transmitted for channel measurement from the beamformer device 100, may compress channel information based on a technique specified in the WLAN standard, and may feed the compressed channel information back to the beamformer device 100. The above-described operation of feeding back the channel information may be referred to as a beamforming feedback, and the beamforming feedback may be performed in a feedback mode.

According to example embodiments, the beamforming feedback that is performed in the feedback mode may be a dual beamforming feedback or a two-step beamforming feedback. The dual beamforming feedback may be used to reduce the feedback overhead. For example, one matrix may be used with wideband, and another matrix may be used with a sub-band (e.g., with a subcarrier). The dual beamforming feedback will be described in detail with reference to FIGS. 2 and 3.

Hereinafter, operations of the wireless communication system 10 and the beamformee device 200 according to example embodiments will be described based on operations for reducing the feedback overhead when the dual beamforming feedback is performed in the feedback mode. However, example embodiments are not limited thereto, and the wireless communication system 10 may perform a normal beamforming transmission based on the channel information obtained by the dual beamforming feedback in a normal operation mode after the feedback mode.

The beamformer device 100 transmits a null data packet (NDP) used for channel measurement. The beamformer device 100 may be referred to as a transmitter or an access point (AP). The NDP may be referred to as a sounding packet.

The beamformer device 100 may include a plurality of antennas (e.g., transmission antennas) 101. The beamformer device 100 may transmit or output the NDP using the plurality of antennas 101. For example, the number of the plurality of antennas 101 may be $N_t$, where $N_t$ is a natural number greater than or equal to two.

The beamformee device 200 receives the NDP from the beamformer device 100 through the channel, estimates the channel based on the NDP, and feeds back a result of estimating the channel to the beamformer device 100. The beamformee device 200 performs the dual beamforming feedback to reduce the feedback overhead of the beamforming feedback, and thus feeds back only a plurality of wideband beamforming matrices WBM and a plurality of subcarrier beamforming matrices SBM, instead of the entire matrix for the channel. For example, as will be described later, the plurality of wideband beamforming matrices WBM and the plurality of subcarrier beamforming matrices SBM may be fed back in the form of a beamforming feedback report. The beamformee device 200 may be referred to as a receiver or a station (STA).

The beamformee device 200 includes a channel estimator 210, a first beamforming matrix provider 220, a dimension reduction unit 230 and a second beamforming matrix provider 240. The beamformee device 200 may further include a plurality of antennas (e.g., reception antennas) 201.

The beamformee device 200 may receive the NDP from the beamformer device 100 through the channel using the plurality of antennas 201. For example, the number of the plurality of antennas 201 may be $N_r$, where $N_r$ is a natural number greater than or equal to two. The channel (e.g., a wireless channel) may be formed between the plurality of antennas 101 of the beamformer device 100 and the plurality of antennas 201 of the beamformee device 200.

The channel estimator 210 obtains a plurality of channel information ECI associated with or related to a plurality of subcarriers by estimating the channel based on the NDP. For example, one channel information may be estimated and obtained for one subcarrier. For example, each channel information may be obtained in the form of a channel matrix representing a frequency response.

The first beamforming matrix provider 220 provides the plurality of wideband beamforming matrices WBM based on the plurality of channel information ECI. The first beamforming matrix provider 220 may be referred to as a wideband beamforming matrix (BM) provider.

The dimension reduction unit 230 generates a plurality of equivalent channel information EECI corresponding to the plurality of channel information ECI based on the plurality of wideband beamforming matrices WBM. For example, each equivalent channel information may be generated in the form of an equivalent channel matrix whose size is reduced from that of corresponding channel information (e.g., that of corresponding channel matrix).

The second beamforming matrix provider 240 provides a plurality of subcarrier beamforming matrices SBM based on the plurality of equivalent channel information EECI. The second beamforming matrix provider 240 may be referred to as a subcarrier beamforming matrix provider.

According to example embodiments, at least one of the plurality of wideband beamforming matrices WBM and the plurality of subcarrier beamforming matrices SBM is selected from among a plurality of codebooks that are pre-designed or are designed in advance. In other words, a codebook utilization scheme may be applied or employed to at least one of the plurality of wideband beamforming matrices WBM and the plurality of subcarrier beamforming matrices SBM.

For example, the first beamforming matrix provider 220 may include a plurality of first codebooks 221 that are pre-designed and correspond to the plurality of wideband beamforming matrices WBM. The plurality of first codebooks 221 may be stored in a memory. The second beamforming matrix provider 240 may include a plurality of second codebooks 241 that are pre-designed and correspond to the plurality of subcarrier beamforming matrices SBM. The plurality of second codebooks 241 may be stored in a memory. The plurality of first codebooks 221 may be referred to as a plurality of wideband codebooks (WCB), and the plurality of second codebooks 241 may be referred to as a plurality of subcarrier codebooks (SCB).

In some example embodiments, as will be described with reference to FIG. 6, when the codebook utilization scheme is applied to the plurality of wideband beamforming matrices WBM, the first beamforming matrix provider 220 may select one of the plurality of first codebooks 221 based on the plurality of channel information ECI, and may output the selected first codebook as one of the plurality of wideband beamforming matrices WBM.

In other example embodiments, as will be described with reference to FIG. 9, when the codebook utilization scheme is applied to the plurality of subcarrier beamforming matrices SBM, the second beamforming matrix provider 240 may select one of the plurality of second codebooks 241 based on the plurality of equivalent channel information EECI, and may output the selected second codebook as one of the plurality of subcarrier beamforming matrices SBM.

In still other example embodiments, as will be described with reference to FIG. 11, the codebook utilization technique may be applied to both the plurality of wideband beamforming matrices WBM and the plurality of subcarrier beamforming matrices SBM.

In some example embodiments, as will be described with reference to FIG. 12, the beamformee device 200 may operate in one of a first feedback mode, a second feedback mode and a third feedback mode based on a characteristic of the channel. The first feedback mode may be a feedback mode in which the codebook utilization scheme is applied to the plurality of wideband beamforming matrices WBM. The second feedback mode may be a feedback mode in which the codebook utilization scheme is applied to the plurality of subcarrier beamforming matrices SBM. The third feedback mode may be a feedback mode in which the codebook utilization scheme is applied to both the plurality of wideband beamforming matrices WBM and the plurality of subcarrier beamforming matrices SBM. In other words, an adaptive codebook utilization scheme in which a feedback mode is selected depending on a condition and/or an environment of the channel may be implemented.

In some example embodiments, as will be described with reference to FIGS. 4A, 4B, 4C, 4D, 5 and 15, the plurality of codebooks (e.g., at least one of the first codebooks 221 and the second codebooks 241) may be designed and stored in the beamformee device 200 at the time of manufacture and/or at an initial operation time.

In the WLAN system, the beamforming may increase antenna gain while maintaining omnidirectional coverage, which results in increased SNR and more stable, higher bandwidth WLAN connections by focusing transmissions to the recipient. These benefits may be achieved by transmitting a signal via an array of antennas and slightly altering the phase of the signal at each antenna in the array. For example, the IEEE 802.11ac standard (e.g., a wireless networking standard in the 802.11 family, developed by the IEEE Standards Association) may provide a protocol for calibrating an array of antennas to direct a signal to any point covered under omnidirectional propagation. The beamformer device 100 may be a device that augments the phase shift of antennas to produce a gain in a desired direction. The beamformee device 200 may be a device that is a target of the beamformer device 100. The beamformee device 200 may participate in the establishment of the beam, but may not augment timings of its antennas.

For the beamforming transmission in the WLAN system, the beamformer device 100 should first obtain the channel information (or channel state information) from the beamformee device 200. For obtaining the channel information, the beamformer device 100 may transmit the NDP (or sounding packet) through the plurality of antennas 101. The beamformee device 200 may receive the NDP through the plurality of antennas 201 and may obtain the channel information based on the NDP. The received signals may represent a result of undergoing the channel, and a relationship between the transmitted signals and the received signals may satisfy Equation 1.

$$Y[k]=H[k]S[k]+N[k] \quad \text{[Equation 1]}$$

In Equation 1, Y[k] denotes a vector of the received signals, S[k] denotes a vector of the transmitted signals (e.g., a vector of sounding signals), H[k] denotes a channel matrix representing the frequency response, N[k] denotes a noise vector, and k denotes a subcarrier index. Each of Y[k] and N[k] may be an $N_r*1$ vector, S[k] may be an $N_t*1$ vector, and H[k] may be an $N_r*N_t$ matrix. $N_t$ denotes the number of the plurality of antennas 101 of the beamformer device 100, and $N_r$ denotes the number of the plurality of antennas 201 of the beamformee device 200.

The beamformee device 200 may estimate channel information H for each subcarrier using the channel estimator 210, and the channel information H may correspond to one of the plurality of channel information ECI. In addition, when the beamformee device 200 operates in the feedback mode, the beamformee device 200 may perform a singular value decomposition (SVD) on the channel information H based on Equation 2.

$$H[k] = U[k]\Sigma[k]V[k]^H \quad \text{[Equation 2]}$$

In Equation 2, each of U[k] and V[k] denotes an unitary matrix, $\Sigma[k]$ is a diagonal matrix including channel singular values, and V[k]H denotes a conjugate transpose matrix of V[k].

In the WLAN system, to reduce the feedback overhead, the beamformee device 200 may not directly feed back V[k]. Instead, the beamformee device 200 may first obtain Q[k] by multiplying a diagonal matrix $$\tilde{D}(e^{-j\phi_{N_t,1}}, \ldots, e^{-j\phi_{N_t-1,N_t-1}})$$

for performing a common-phase shift by V[k] based on Equation 3, where $e^{-j\Phi_{i,j}}$ is a phase value corresponding to an element in an i-th row and a j-th column of V[k].

$$Q[k]=V[k]\tilde{D} \quad \text{[Equation 3]}$$

Subsequently, the beamformee device 200 may compress and feed angle values φ and ψ corresponding back to each element of Q[k] using Givens rotation. In other words, the beamformee device 200 may quantize the angle values φ and ψ obtained based on Equation 4, and may feed the quantized angle values back to the beamformer device 100.

$$Q[k] = \left[\prod_{i=1}^{\min(N_r,N_t-1)} \left[D_i(1_{i-1}, e^{j\phi_{i,i}}, \ldots, e^{j\phi_{N_t-1,i}}, 1)\prod_{l=i+1}^{N_t} G_{li}^T(\psi_{li})\right]\right]\tilde{I}_{N_t \times N_r} \quad \text{[Equation 4]}$$

In Equation 4, $1_{i-1}$ may be a vector including elements of 1. In addition, $D_i(1_{i-1}, e^{j\phi_{i,i}}, \ldots, e^{j\phi_{N_r-1,i}})$ and the Givens rotation $G_{li}(\psi)$ may be defined as in Equation 5 and Equation 6, respectively.

$$D_i\left(1_{i-1}, e^{j\phi_{i,i}}, \ldots, e^{j\phi_{N_r-1,i}}, 1\right) = \quad \text{[Equation 5]}$$

$$\begin{bmatrix} I_{i-1} & 0 & \cdots & \cdots & 0 \\ 0 & e^{j\phi_{i,i}} & 0 & \cdots & 0 \\ \vdots & 0 & \ddots & 0 & 0 \\ \vdots & \vdots & 0 & e^{j\phi_{N_t-1,i}} & 0 \\ 0 & 0 & 0 & 0 & 1 \end{bmatrix}$$

$$G_{li}(\psi) = \begin{bmatrix} I_{i-1} & 0 & 0 & \cdots & 0 \\ 0 & \cos(\psi) & 0 & \sin(\psi) & 0 \\ 0 & 0 & I_{l-i-1} & 0 & 0 \\ 0 & -\sin(\psi) & 0 & \cos(\psi) & 0 \\ 0 & 0 & 0 & 0 & I_{N_t-1} \end{bmatrix} \quad \text{[Equation 6]}$$

In other words, the plurality of wideband beamforming matrices WBM and the plurality of subcarrier beamforming matrices SBM that are fed back from the beamformee device 200 to the beamformer device 100 may include the angle values φ and ψ that are obtained based on Equation 4.

Figure 2:
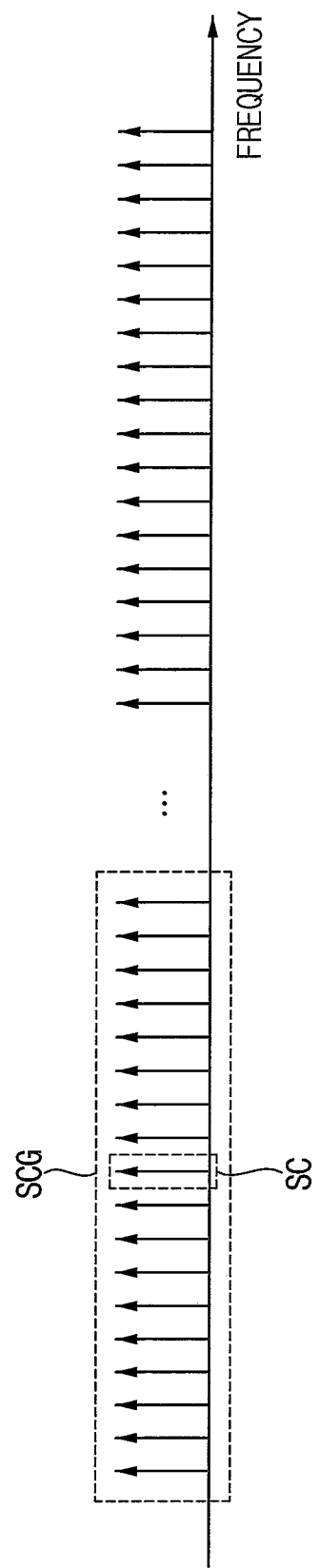
FIGS. 2 and 3 are diagrams for describing a dual beamforming feedback according to example embodiments.
Figure 3:
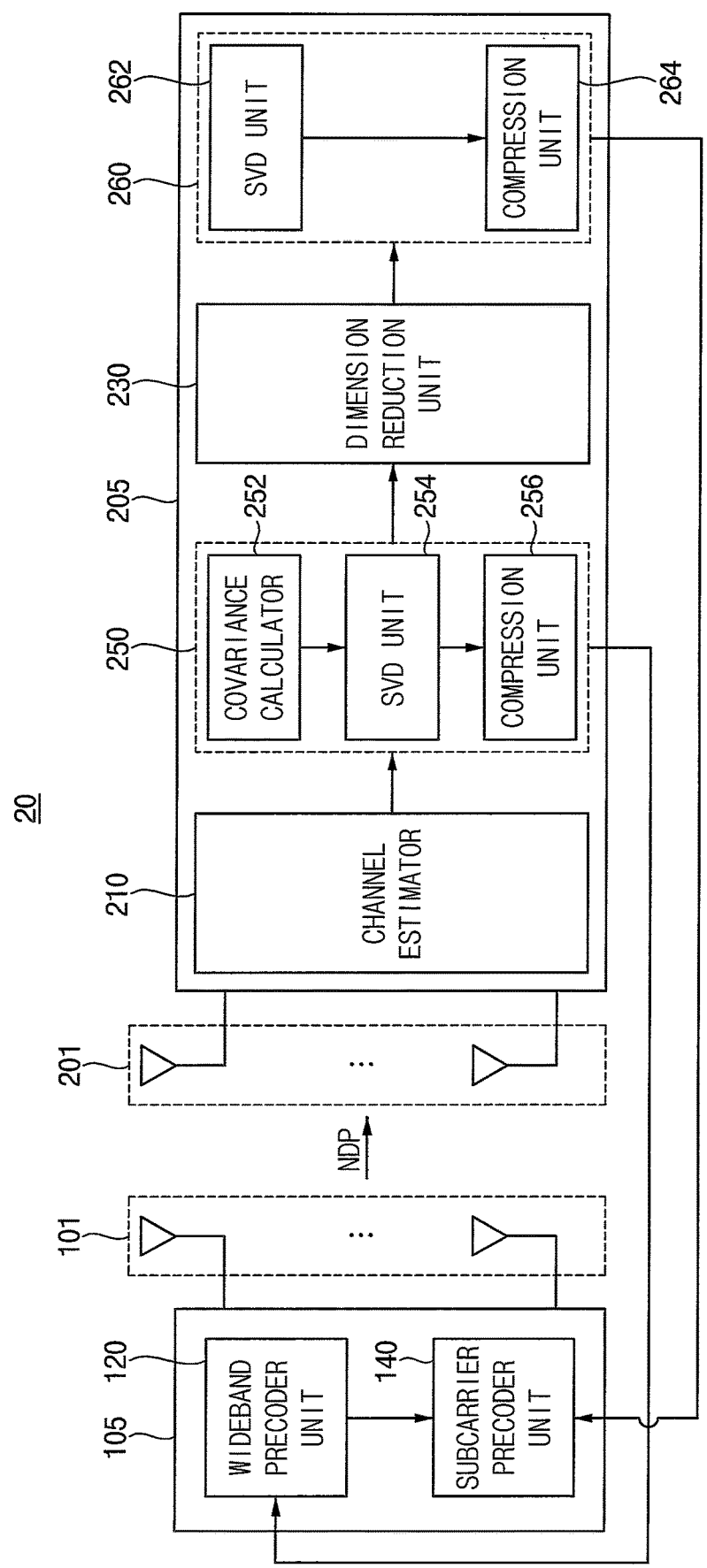
Figure 4A:
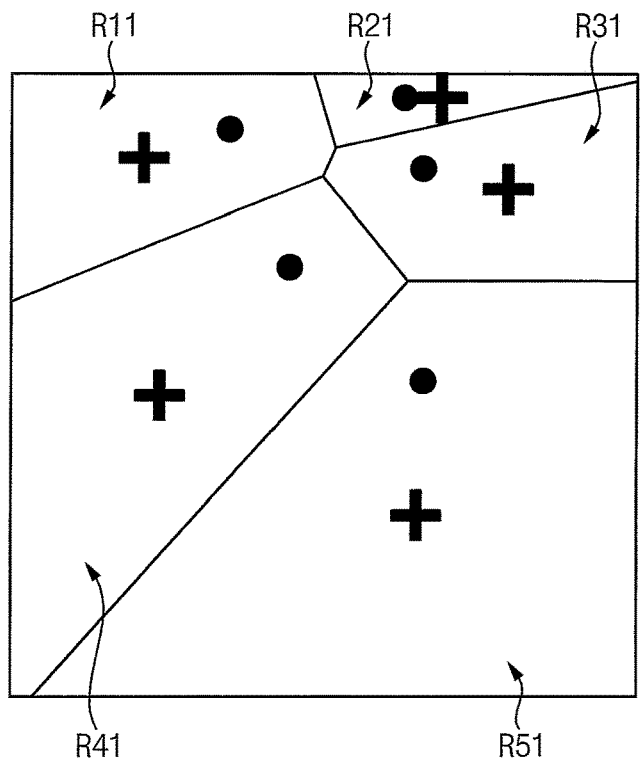
FIGS. 4A, 4B, 4C, 4D and 5 are diagrams for describing a process of designing a codebook used in a beamformee device according to example embodiments.
Figure 4B:
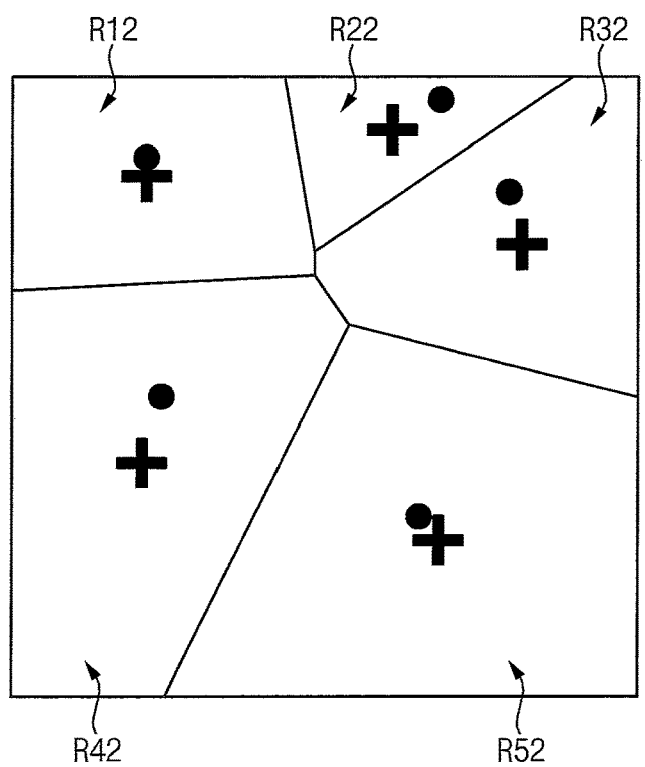
Figure 4C:
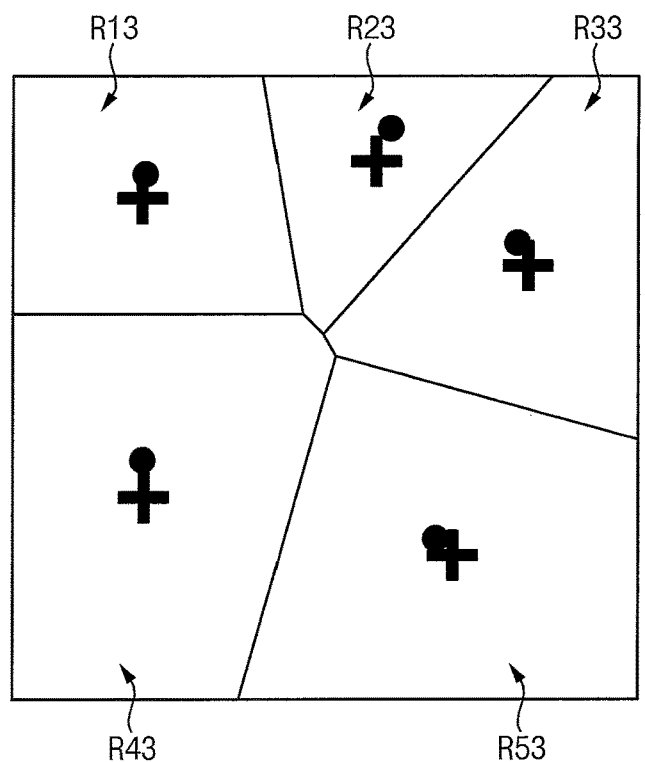
Figure 4D:
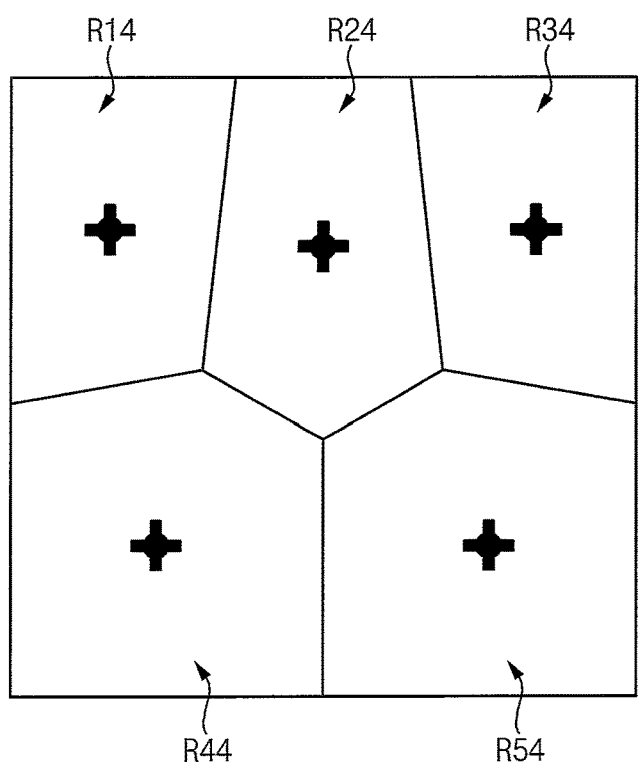

FIGS. 2 and 3 are diagrams for describing a dual beamforming feedback.

FIG. 2 illustrates a plurality of subcarriers that are used for the signal transmission between a beamformer device and a beamformee device in a wireless communication system. In FIG. 2, one arrow may represent one subcarrier SC. FIG. 3 illustrates an example of a wireless communication system that performs the dual beamforming feedback, e.g., a dimension reduction scheme for reducing a size of a beamforming matrix.

Referring to FIGS. 2 and 3, a wireless communication system 20 may include a beamformer device 105 and a beamformee device 205. The beamformer device 105 may include a plurality of antennas 101, a wideband precoder unit 120 and a subcarrier precoder unit 140. The beamformee device 205 may include a plurality of antennas 201, a channel estimator 210, a wideband precoder calculator 250, a dimension reduction unit 230 and a subcarrier precoder calculator 260. The wideband precoder calculator 250 may include a covariance calculator 252, an SVD unit 254 and a compression unit 256. The subcarrier precoder calculator 260 may include an SVD unit 262 and a compression unit 264. The plurality of antennas 101 and 201, the channel estimator 210 and the dimension reduction unit 230 may be substantially the same as the plurality of antennas 101 and 201, the channel estimator 210 and the dimension reduction unit 230 in FIG. 1, respectively.

The beamformee device 205 may receive a NDP or sounding packet, and may obtain channel information (e.g., a channel matrix) H[k] by estimating a channel using the channel estimator 210, where k=0, 1, . . . , $N_{\mathit{fft}}$−1. Here, $N_{\mathit{fft}}$ may represent the number of the plurality of subcarriers SC in one OFDM symbol.

The beamformee device 205 may divide the plurality of subcarriers SC into M groups SCG, where M is a natural number greater than or equal to two, and thus each of the groups SCG may include Ng (=$N_{\mathit{fft}}$/M) subcarriers. The beamformee device 205 may form a wideband beam (e.g., wideband beamforming information or a wideband beamforming matrix) having the same value for all of the groups SCG. The beamformee device 205 may obtain the wideband beam based on Equation 7 using the covariance calculator 252.

$$\text{Cov}[m] = \quad \text{[Equation 7]}$$

$$\frac{1}{N_g} \sum_{k=0}^{N_g-1} (H_{N_g*m+k}[N_g*m+k])^H (H_{N_g*m+k}[N_g*m+k]),$$

$$m = 0, 1, \ldots, M-1$$

The beamformee device 205 may perform an SVD on the covariance matrix (e.g., Cov[m]) obtained by Equation 7 using the SVD unit 254, and may obtain a unitary matrix $W_{WB}[m]$ of the wideband beam as in Equation 8.

$$W_{WB}[m]=SVD(\text{Cov}[m]) \quad \text{[Equation 8]}$$

The beamformee device 205 may take first to K-th columns among a plurality of columns of the unitary matrix $W_{WB}[m]$, may perform compression on the unitary matrix $W_{WB}[m]$ based on the Givens rotation according to Equations 3 to 6 using the compression unit 256, and may obtain angle values φ and ψ associated with the wideband beam. Here, K may be a design parameter and may be an adjustable parameter.

Next, the beamformee device 205 may form a per-subcarrier beam (e.g., subcarrier beamforming information or a subcarrier beamforming matrix) for each subcarrier SC.

First, the beamformee device 205 may multiply the channel matrix H[k] by the unitary matrix $W_{WB}[m]$ of the wideband beam using the dimension reduction unit 230, and may obtain equivalent channel information (e.g., an equivalent channel matrix) as in Equation 9.

$$\tilde{H}[k]=H[k]W_{WB}[m] \quad \text{[Equation 9]}$$

The equivalent channel matrix $\tilde{H}[k]$ may be reduced in size compared to the channel matrix H[k]. For example, H[k] may have a size of $N_r*N_t$, and $W_{WB}[m]$ may have a size of $N_t*K$. Thus, $\tilde{H}[k]$ may have a size of Nr*K, and the size of the matrix may be thereby reduced (e.g., dimension reduction). For example, when $N_t$=16, $N_r$=2 and K=8, $\tilde{H}[k]$ having a size of 2*8 may be generated based on H[k] having a size of 2*16. As 2*8 is less than 2*16, the size of the matrix may be reduced.

The beamformee device 205 may perform an SVD on the equivalent channel matrix $\tilde{H}[k]$ obtained by Equation 9 using the SVD unit 262, and may obtain a unitary matrix $W_{SC}[k]$ of the subcarrier beam as in Equation 10.

$$W_{SC}[k]=SVD(\tilde{H}[k]) \quad \text{[Equation 10]}$$

The beamformee device 205 may perform compression on the unitary matrix $W_{SC}[k]$ based on the Givens rotation according to Equations 3 to 6 using the compression unit 264, and may obtain angle values φ and ψ associated with the subcarrier beam.

When feeding back the channel information for the beamforming transmission, the beamformee device 205 may feed back the angle values φ and ψ for M wideband beams obtained by the compression unit 256, and may feed back the angle values φ and ψ for Nm subcarrier beams obtained by the compression unit 264. In FIG. 3, an arrow from the wideband precoder calculator 250 to the wideband precoder unit 120 may represent the angle values φ and ψ for the M wideband beams, and an arrow from the subcarrier precoder calculator 260 to the subcarrier precoder unit 140 may represent the angle values φ and ψ for the $N_{\mathit{fft}}$ subcarrier beams.

The wideband precoder unit 120 may restore the M wideband beams based on the angle values φ and ψ fed back from the wideband precoder calculator 250, the subcarrier precoder unit 140 may restore the $N_{fft}$ subcarrier beams based on the angle values φ and ψ fed back from the subcarrier precoder calculator 260, and the channel information may be obtained based on the restored M wideband beams and the restored $N_{fft}$ subcarrier beams.

As described above, the wideband beamforming matrix may be determined by the beamformee device 205 from the covariance matrix of the wideband channel. The wideband bandwidth may depend on a channel condition and a MIMO mode. For the single-user beamforming, the wideband bandwidth may be about 80 MHz. For the multi-user beamforming, less than about 80 MHz may be required (e.g., about 5 or 10 MHz per user). After calculating the covariance matrix, the wideband beamforming matrix may be obtained by a method used in compressed beamforming, e.g., an SVD. The design parameter K may be determined by the beamformee device 205 or the beamformer device 105. For example, in a case of the single-user beamforming, K may be determined by the beamformee device 205. In a case of the multi-user beamforming or trigger-based feedback, K may be determined by the beamformer device 105. The tradeoff between complexity and performance affects the choice of K. Various factors include timing, delay spread, side of bandwidth, spatial correlation between antennas, etc.

According to example embodiments, the wideband precoder calculator 250 and the subcarrier precoder calculator 260 may be replaced with the first beamforming matrix provider 220 and the second beamforming matrix provider 240, respectively. In other words, instead of calculating and feeding back both the plurality of wideband beamforming matrices WBM and the plurality of subcarrier beamforming matrices SBM based on the operations described with reference to FIGS. 2 and 3, the codebook utilization scheme may be applied to at least one of the plurality of wideband beamforming matrices WBM and the plurality of subcarrier beamforming matrices SBM. Accordingly, the amount of computation and the amount of data to be fed back may be reduced, and thus the feedback overhead may be reduced.

FIGS. 4A, 4B, 4C, 4D and 5 are diagrams for describing a process of designing a codebook used in a beamformee device according to example embodiments.

Referring to FIGS. 4A, 4B, 4C, 4D and 5, when generating the plurality of codebooks, a Lloyd algorithm may be performed using a discrete-time Fourier transform (DFT) codebook as an initial value.

For example, an initial DFT codebook w(n) may be obtained based on Equation 11.

$$w(n) = \frac{1}{\sqrt{N_t}} [1 \ \exp(-j2\pi \ 1 \ n) \ \exp(-j2\pi \ 2 \ n) \ \ldots \ \exp(-j2\pi \ (N_t-1) \ n)]^T \quad \text{[Equation 11]}$$

In Equation 11, $$n = 0, \frac{1}{NB}, \frac{2}{NB}, \ldots, \frac{NB-1}{NB},$$

N denotes the number of codebooks, and B denotes the number of columns of each codebook. A j-th vector of an i-th codebook may be determined by $$n = \frac{N*j+i}{NB}.$$

According to example embodiments, N DFT codebooks $W_n^{(0)}$ (n=0, 1, ..., N−1) may be generated using Equation 11, and the Lloyd algorithm may be performed using the N DFT codebooks as initial values.

In some example embodiments, the Lloyd algorithm may be performed based on the following order (1), (2), (3) and (4). First, the Euclidean distance function ED(•) for performing the Lloyd algorithm may be defined as in Equation 12.

$$ED(A,B) = \|AD-B\| \text{ where } D = \text{diag}(e^{-j\phi_1}, e^{-j\phi_2}, \ldots, e^{-j\phi_N}), e^{j\phi_N} = b^H a / |b_H a| \quad \text{[Equation 12]}$$

In Equation 12, diag denotes a function for extracting diagonal elements of a matrix, capital letters denote the matrix, and small letters denote a column of the matrix.

(1) Based on the IEEE D-channel model, multiple (e.g., about 10000) samples of the channel matrix H may be generated. $V \in \mathbb{V}$ may be generated by performing an SVD for each sample of the channel matrix H.

(2) Next, for a given codebook $W_n^{(i-1)}$ (n=0, 1, ..., N−1) (an initial codebook is a DFT codebook, i=1), V samples may be divided into N regions based on the Euclidean distance as in Equation 13.

$$X_n = \{V \in \mathbb{V} | ED(V, W_n^{(i-1)}) < ED(V, W_m^{(i-1)}), n \neq m, n,m = 0,1, \ldots, N-1\} \quad \text{[Equation 13]}$$

(3) Next, for $X_n$ (n=0, 1, ..., N−1), W at which an average Euclidean distance is the minimum may be calculated as in Equation 13 and may be set as the i-th codebook.

$$W_n^{(i)} = \arg \min_W E\{ED(V,W)\} V \in X_n, W^H W = I \quad \text{[Equation 14]}$$

(4) Next, the processes of (2) and (3) may be repeatedly performed until the convergence condition $J^{(i)}$ is satisfied. In Equation 15, $V \to W_n^{(i)}$ may be a set of V, which is $ED(V, W_n^{(i)}) < ED(V, W_m^{(i)})$, n≠m.

If $J^{(i)} > \epsilon$, then i=i+1

Else, Stop where $J^{(i)} = \sum_{n=0}^{N-1} \sum_{V \to W_n^{(i)}} ED(V, W_n^{(i)})$ [Equation 15]

FIGS. 4A, 4B, 4C and 4D illustrate a process of detecting a centroid or a geometric center using the Lloyd algorithm.

In FIGS. 4A, 4B, 4C and 4D, a portion marked with a dot (•) may represent a centroid of each region, and a portion marked with a cross (+) may represent a codebook corresponding to each region.

FIGS. 4A, 4B, 4C and 4D illustrate results of iteration of the above-described algorithm once, twice, three times and fifteen times, respectively. As the algorithm is repeated, five regions R11, R21, R31, R41 and R51 in FIG. 4A may be changed to five regions R12, R22, R32, R42 and R52 in FIG. 4B, five regions R13, R23, R33, R43 and R53 in FIG. 4C, and five regions R14, R24, R34, R44 and R54 in FIG. 4D. In addition, it can be seen that the centroid of each region and the corresponding codebook are matched and the convergence condition of Equation 15 is satisfied.

Figure 5:
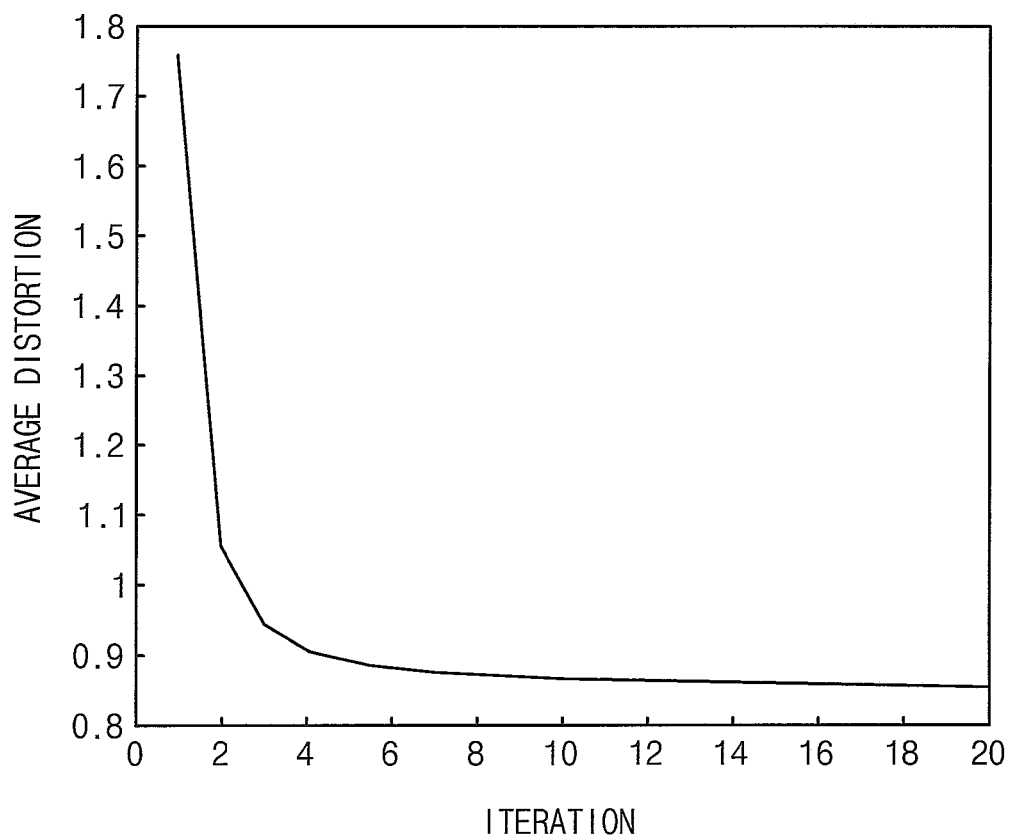

FIG. 5 illustrates a process of convergence under the convergence condition of Equation 15 as the Lloyd algorithm is repeatedly performed. It can be seen that the corresponding codebook is converged to a desired optimal codebook when the Lloyd algorithm is repeated about ten or more times.

Figure 6:
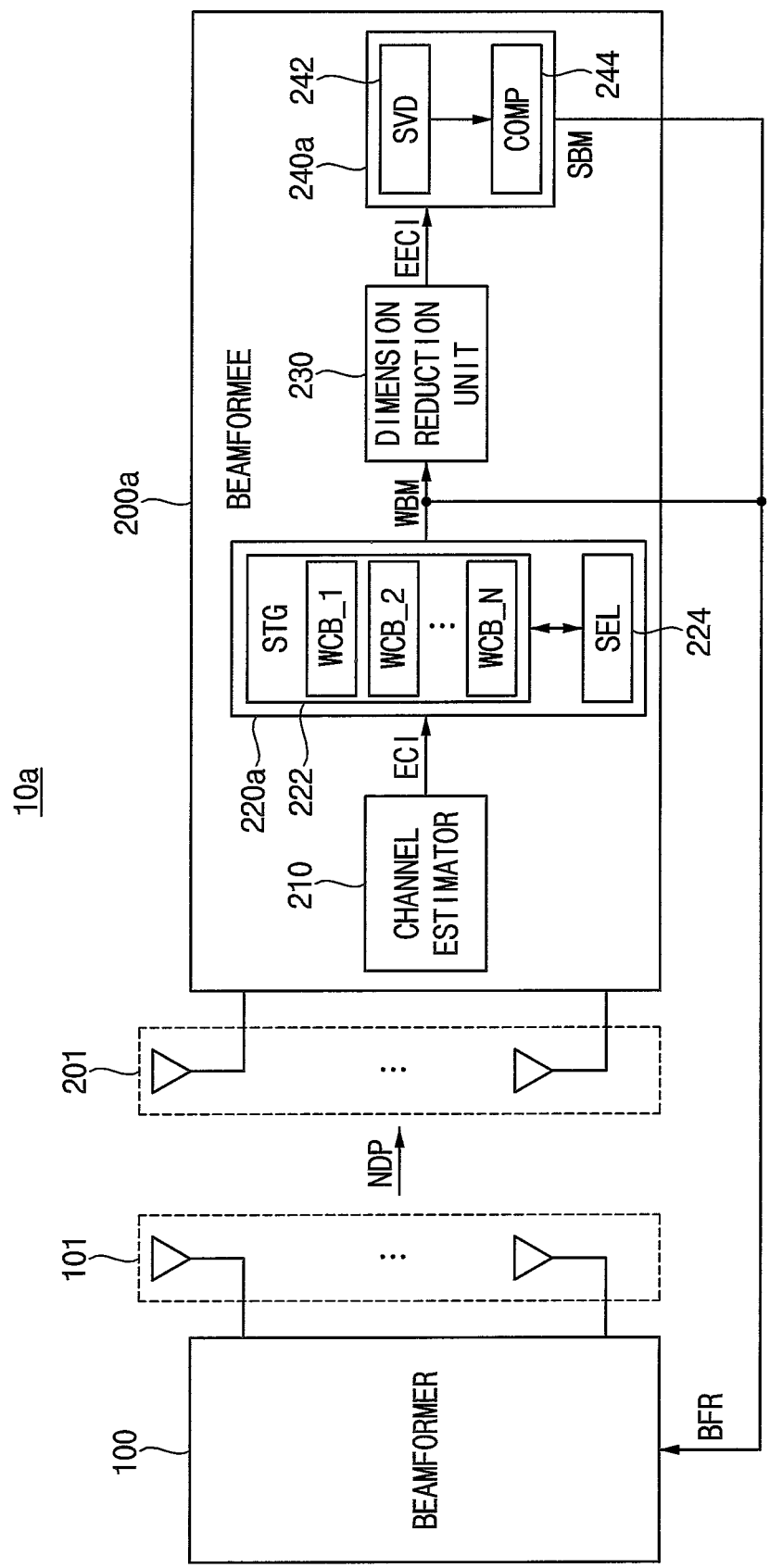
FIG. 6 is a block diagram illustrating a beamformee device and a wireless communication system according to example embodiments.

FIG. 6 is a block diagram illustrating an example of a beamformee device and a wireless communication system of FIG. 1. Repeated description will be omitted.

Referring to FIG. 6, a wireless communication system 10a includes a beamformer device 100 and a beamformee device 200a. The beamformer device 100 may include a plurality of antennas 101. The beamformee device 200a may include a plurality of antennas 201, a channel estimator 210, a first beamforming matrix provider 220a, a dimension reduction unit 230 and a second beamforming matrix provider 240a.

FIG. 6 illustrates an example where the codebook utilization scheme is applied only to the plurality of wideband beamforming matrices WBM, and thus a configuration of the first beamforming matrix provider 220a in the example of FIG. 6 may be changed. The beamformer device 100, the plurality of antennas 101 and 201, the channel estimator 210 and the dimension reduction unit 230 may be substantially the same as those described with reference to FIGS. 1 and 3.

The first beamforming matrix provider 220a may include a first storage unit (STG) 222 and a first selector (SEL) 224.

The first storage unit 222 may store a plurality of first codebooks WCB_1, WCB_2, . . . , WCB_N. For example, the plurality of first codebooks WCB_1 to WCB_N may be pre-designed and pre-stored based on the Lloyd algorithm described with reference to FIGS. 4A, 4B, 4C, 4D and 5. For example, the first storage unit 222 may include a volatile memory, such as a dynamic random access memory (DRAM), a static random access memory (SRAM), a mobile DRAM, or the like, and/or a nonvolatile memory, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The first selector 224 may select the plurality of wideband beamforming matrices WBM based on the plurality of first codebooks WCB_1 to WCB_N. For example, the first selector 224 may select a codebook that is capable of obtaining the largest beamforming gain. For example, based on the plurality of channel information ECI, the first selector 224 may select one of the plurality of first codebooks WCB_1 to WCB_N as one of the plurality of wideband beamforming matrices WBM, and the selected first codebook may be used to maximize the power of the channel.

In some example embodiments, the first selector 224 may select one of the plurality of wideband beamforming matrices WBM based on Equation 16.

$$W_w = \arg \max_{W_i \in \mathbb{C}} \frac{1}{N_g} \sum_{k=0}^{N_g-1} \|H^H[k]H[k]W_i\| \quad \text{[Equation 16]}$$

In Equation 16, $W_w$ denotes the selected wideband beamforming matrix, $N_g$ denotes the number of subcarriers corresponding to one wideband beam, $H[k]$ denotes a channel matrix corresponding to one of the plurality of channel information ECI, $H^H[k]$ denotes a conjugate transpose matrix of $H[k]$, $W_i$ denotes an i-th codebook of a codebook set $\mathbb{C}$, e.g., an i-th codebook among the plurality of first codebooks WCB_1 to WCB_N, and k denotes an index of the plurality of subcarriers. A function argmax represents arguments of max, e.g., a function that returns a value that maximizes the function.

The second beamforming matrix provider 240a may include an SVD unit 242 and a compression unit (COMP) 244.

The SVD unit 242 may perform an SVD on the plurality of equivalent channel information EECI. The compression unit 244 may compress an output of the SVD unit 242. The SVD unit 242 and the compression unit 244 may be substantially the same as the SVD unit 262 and the compression unit 264 in FIG. 3, respectively. In other words, when the codebook utilization scheme is applied only to the plurality of wideband beamforming matrices WBM, the second beamforming matrix provider 240a may be implemented substantially the same as the subcarrier precoder calculator 260.

The plurality of wideband beamforming matrices WBM provided from the first beamforming matrix provider 220a and the plurality of subcarrier beamforming matrices SBM provided from the second beamforming matrix provider 240a may be fed back to the beamformer device 100. For example, a beamforming feedback report BFR generated based on the plurality of wideband beamforming matrices WBM and the plurality of subcarrier beamforming matrices SBM may be fed back to the beamformer device 100.

Figure 7:
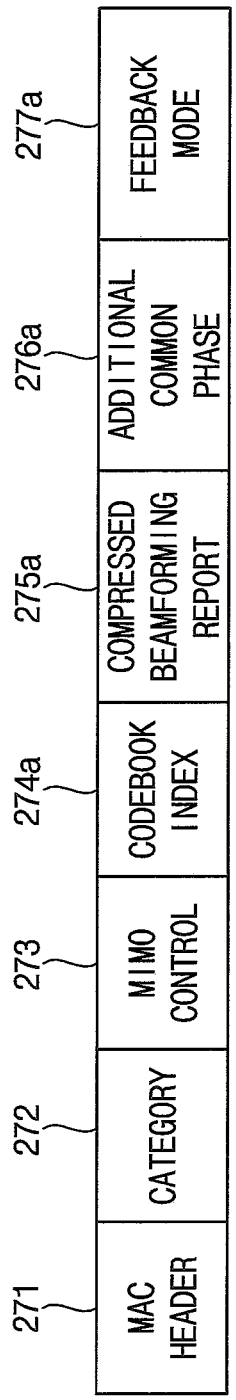
FIG. 7 is a diagram illustrating a beamforming feedback report generated by a beamformee device according to example embodiments.

FIG. 7 is a diagram illustrating an example of a beamforming feedback report generated by a beamformee device of FIG. 6.

Referring to FIG. 7, a beamforming feedback report BFR may include media access control (MAC) header information 271, category information 272, multiple-input multiple-output (MIMO) control information 273, codebook index information 274a, compressed beamforming report (CBR) information 275a, additional common phase information 276a and feedback mode information 277a. The beamforming feedback report BFR of FIG. 7 may further include the codebook index information 274a, the additional common phase information 276a and the feedback mode information 277a.

The codebook index information 274a may correspond to the plurality of wideband beamforming matrices WBM, and the CBR information 275a may correspond to the plurality of subcarrier beamforming matrices SBM. The feedback mode information 277a may represent the first feedback mode to which the codebook utilization scheme is applied to the plurality of wideband beamforming matrices WBM.

The beamforming feedback report BFR of FIG. 7 may not include all information of the plurality of wideband beamforming matrices WBM and the plurality of subcarrier beamforming matrices SBM. Instead, the beamforming feedback report BFR of FIG. 7 may include only some or partial information of the plurality of wideband beamforming matrices WBM and the plurality of subcarrier beamforming matrices SBM. For example, for the plurality of subcarrier beamforming matrices SBM, the CBR information 275a generated by compressing the angle values φ and ψ of the $N_{\mathit{fb}}$ subcarrier beams, which are described with reference to FIGS. 2 and 3, may be fed back. For the plurality of wideband beamforming matrices WBM to which the codebook utilization scheme is applied, the codebook index information 274a representing codebooks corresponding to the M wideband beams may be fed back. Accordingly, the amount of computation and the amount of data to be fed back may be reduced, and thus the feedback overhead may be reduced.

In addition, the additional common phase information 276a may include common phase information $\varphi_{common}$ constituting $$\tilde{D}(e^{-j\phi_{N_t,1}}, \ldots, e^{-j\phi_{N_{t-1},N_{t-1}}})$$

in Equation 3. For the accuracy of computation, the common phase information $\varphi_{common}$ for the subcarrier beams may be additionally fed back together with the angle values $\varphi$ and $\psi$.

Figure 8:
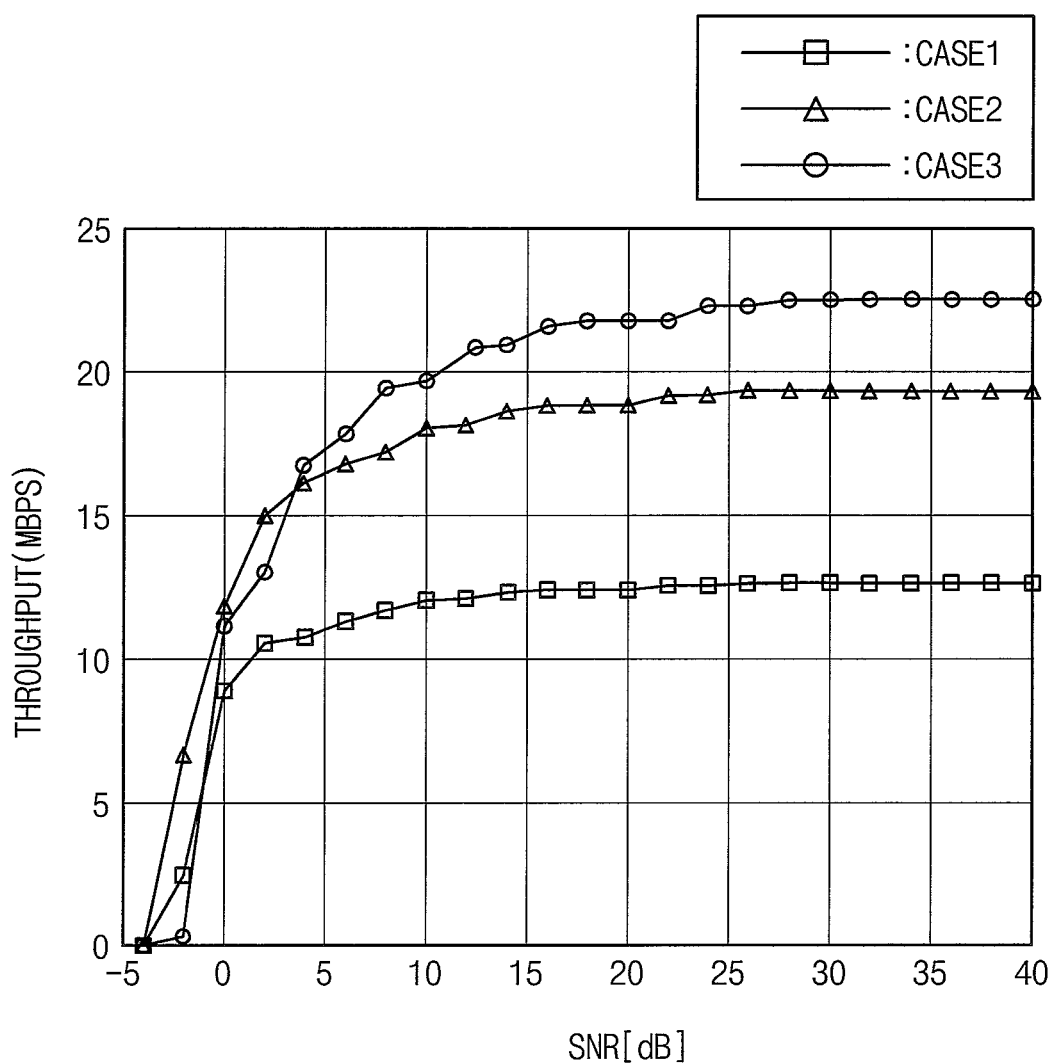
FIG. 8 is a diagram illustrating performance of a beamformee device according to example embodiments.

FIG. 8 is a diagram illustrating performance of a beamformee device of FIG. 6.

Referring to FIG. 8, CASE1 represents a beamformee device in which the dual beamforming feedback is not performed, CASE2 represents a beamformee device in which only the dual beamforming feedback is performed as illustrated in FIGS. 2 and 3, and CASE3 represents the beamformee device 200a in which the dual beamforming feedback is performed and the codebook utilization scheme is applied to the plurality of wideband beamforming matrices WBM as illustrated in FIG. 6. It can be seen that the feedback overhead is reduced and the amount of data transmission increases in the beamformee device 200a according to example embodiments.

Figure 9:
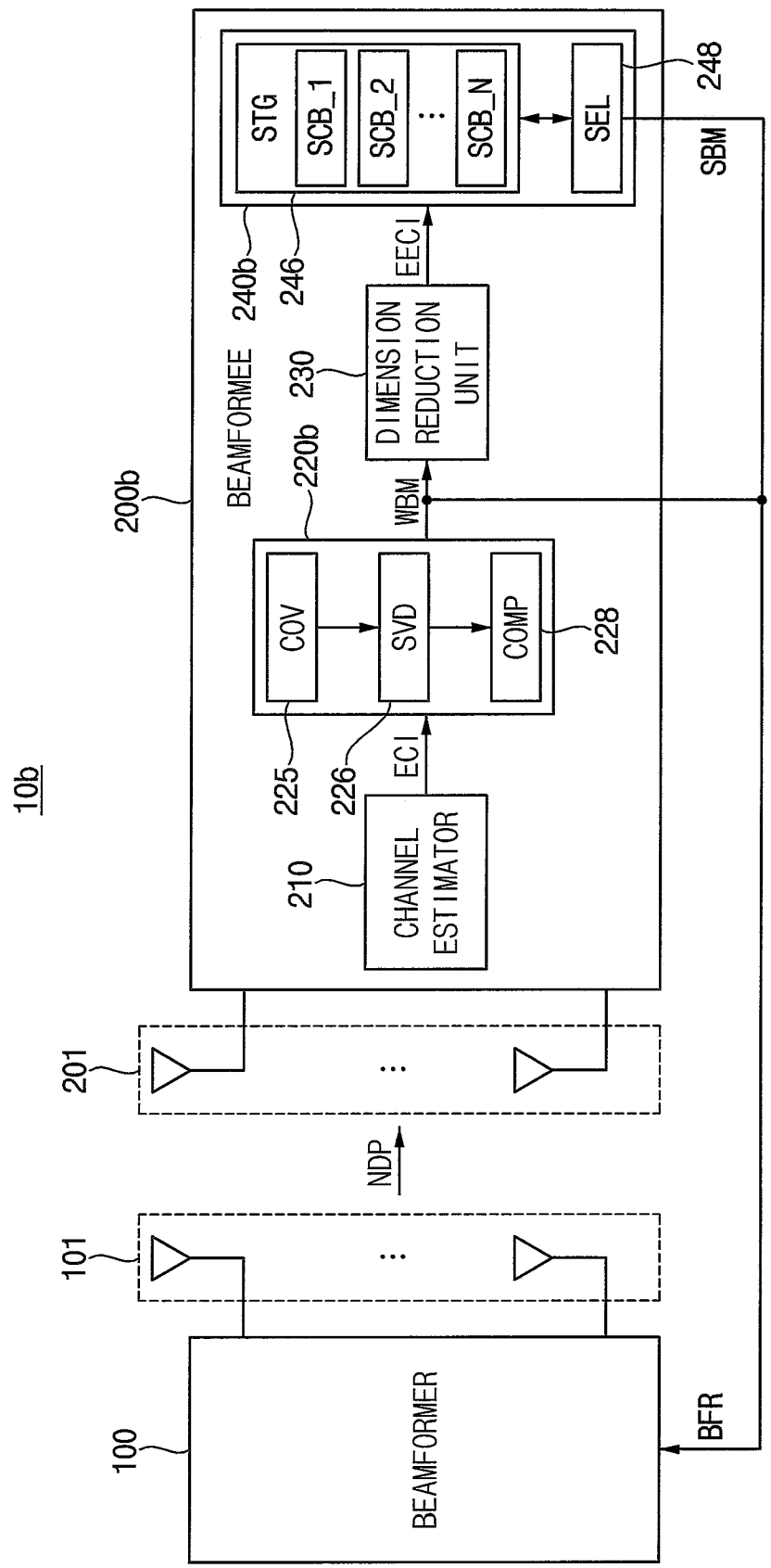
FIG. 9 is a block diagram illustrating a beamformee device and a wireless communication system according to example embodiments.

FIG. 9 is a block diagram illustrating another example of a beamformee device and a wireless communication system of FIG. 1. Repeated description will be omitted.

Referring to FIG. 9, a wireless communication system 10b includes a beamformer device 100 and a beamformee device 200b. The beamformer device 100 may include a plurality of antennas 101. The beamformee device 200b may include a plurality of antennas 201, a channel estimator 210, a first beamforming matrix provider 220b, a dimension reduction unit 230 and a second beamforming matrix provider 240b.

FIG. 9 illustrates an example where the codebook utilization scheme is applied only to the plurality of subcarrier beamforming matrices SBM, and thus a configuration of the second beamforming matrix provider 240b in the example of FIG. 9 may be changed. The beamformer device 100, the plurality of antennas 101 and 201, the channel estimator 210 and the dimension reduction unit 230 may be substantially the same as those described with reference to FIGS. 1 and 3.

The first beamforming matrix provider 220b may include a covariance calculator (COV) 225, an SVD unit 226 and a compression unit 228.

The covariance calculator 225 may calculate a covariance matrix based on the plurality of channel information ECI. The SVD unit 226 may perform an SVD on an output of the covariance calculator 225. The compression unit 228 may compress an output of the SVD unit 226. The covariance calculator 225, the SVD unit 226 and the compression unit 228 may be substantially the same as the covariance calculator 252, the SVD unit 254 and the compression unit 256 in FIG. 3, respectively. In other words, when the codebook utilization scheme is applied only to the plurality of subcarrier beamforming matrices SBM, the first beamforming matrix provider 220b may be implemented substantially the same as the wideband precoder calculator 250.

The second beamforming matrix provider 240b may include a second storage unit 246 and a second selector 248.

The second storage unit 246 may store a plurality of second codebooks SCB_1, SCB_2, . . . , SCB_N. For example, the plurality of second codebooks SCB_1 to SCB_N may be pre-designed and pre-stored based on the Lloyd algorithm described with reference to FIGS. 4A, 4B, 4C, 4D and 5. For example, the second storage unit 246 may include a volatile memory and/or a nonvolatile memory.

The second selector 248 may select the plurality of subcarrier beamforming matrices SBM based on the plurality of second codebooks SCB_1 to SCB_N. For example, the second selector 248 may select a codebook that is capable of obtaining the largest beamforming gain. For example, based on the plurality of equivalent channel information EECI, the second selector 248 may select one of the plurality of second codebooks SCB_1 to SCB_N as one of the plurality of subcarrier beamforming matrices SBM, and the selected second codebook may be closest to the plurality of equivalent channel information EECI.

In some example embodiments, the second selector 248 may select one of the plurality of subcarrier beamforming matrices SBM based on Equation 17.

$$W_s = \arg\min_{W_i \in \mathbb{C}} \frac{1}{N_g} \sum_{k=0}^{N_g-1} ED(V_{sc}[k], W_i) \quad \text{[Equation 17]}$$

In Equation 17, $W_s$ denotes the selected subcarrier beamforming matrix, $N_g$ denotes the number of subcarriers corresponding to one wideband beam, ED(•) denotes the Euclidean distance function, $V_{sc}[k]$ denotes a unitary matrix for a channel matrix corresponding to one of the plurality of equivalent channel information EECI, $W_i$ denotes an i-th codebook of a codebook set $\mathbb{C}$, e.g., an i-th codebook among the plurality of second codebooks SCB_1 to SCB_N, and k denotes an index of the plurality of subcarriers. A function argmin represents arguments of min, e.g., a function that returns the value that minimizes the function.

The plurality of wideband beamforming matrices WBM provided from the first beamforming matrix provider 220b and the plurality of subcarrier beamforming matrices SBM provided from the second beamforming matrix provider 240b may be fed back to the beamformer device 100. For example, a beamforming feedback report BFR generated based on the plurality of wideband beamforming matrices WBM and the plurality of subcarrier beamforming matrices SBM may be fed back to the beamformer device 100.

FIG. 10 is a diagram illustrating an example of a beamforming feedback report generated by a beamformee device of FIG. 9.

Referring to FIG. 10, a beamforming feedback report BFR may include MAC header information 271, category information 272, MIMO control information 273, codebook index information 274b, CBR information 275b and feedback mode information 277b. The beamforming feedback report BFR of FIG. 10 may further include the codebook index information 274b and the feedback mode information 277b.

The codebook index information 274b may correspond to the plurality of subcarrier beamforming matrices SBM, and the CBR information 275b may correspond to the plurality of wideband beamforming matrices WBM. The feedback mode information 277b may represent the second feedback mode to which the codebook utilization scheme is applied to the plurality of subcarrier beamforming matrices SBM.

The beamforming feedback report BFR of FIG. 10 may include only partial information of the plurality of wideband beamforming matrices WBM and the plurality of subcarrier beamforming matrices SBM. For example, for the plurality of wideband beamforming matrices WBM, the CBR information 275b generated by compressing the angle values $\varphi$ and $\psi$ for the M wideband beams, which are described with reference to FIGS. 2 and 3, may be fed back. For the plurality of subcarrier beamforming matrices SBM to which the codebook utilization scheme is applied, the codebook index information 274b representing codebooks corresponding to the Nm subcarrier beams may be fed back. Accordingly, the amount of computation and the amount of data to be fed back may be reduced, and thus the feedback overhead may be reduced.

Figure 11:
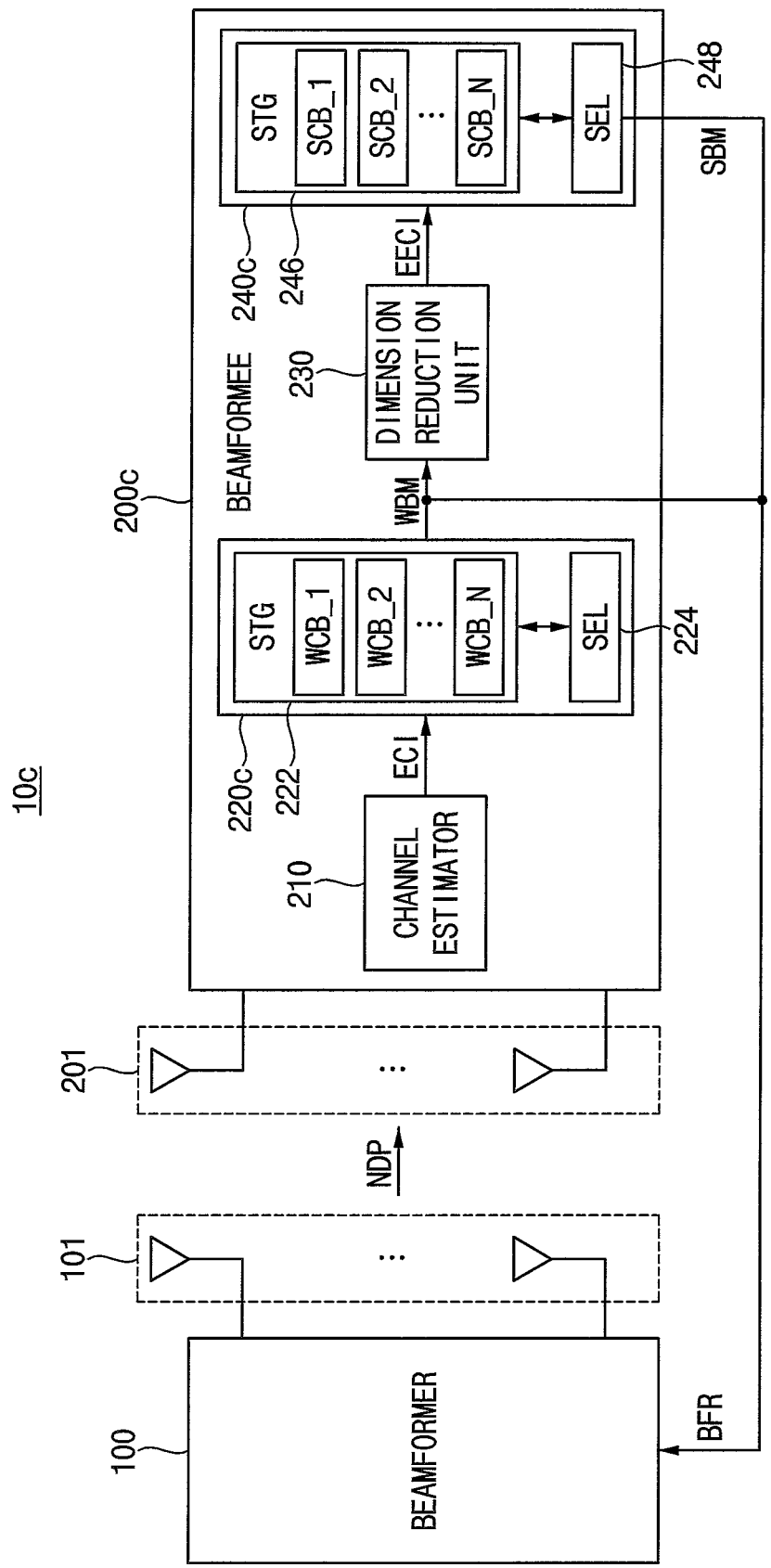
FIGS. 11 and 12 are block diagrams illustrating beamformee devices and wireless communication systems according to example embodiments.
Figure 12:
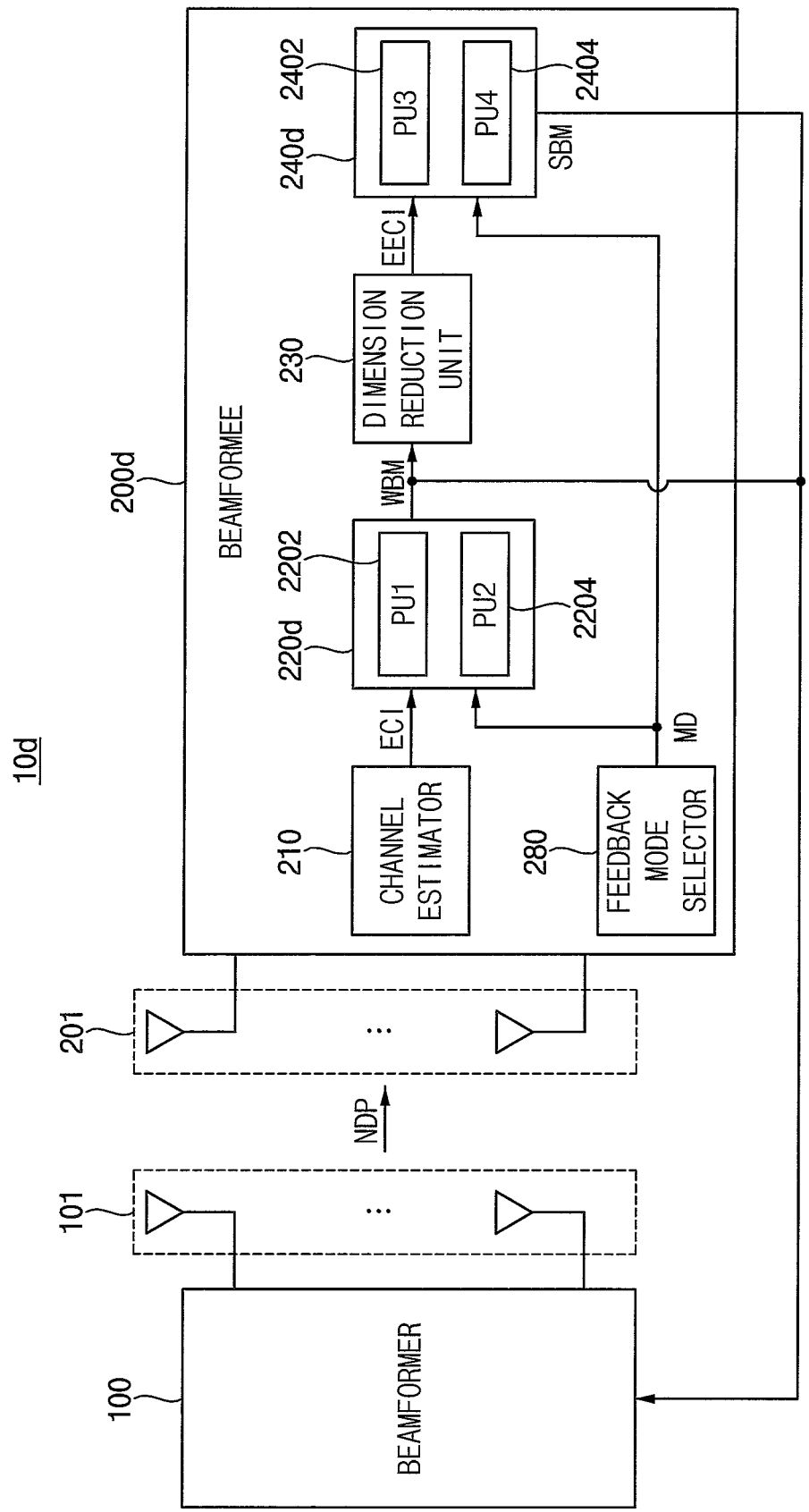

FIGS. 11 and 12 are block diagrams illustrating other examples of a beamformee device and a wireless communication system of FIG. 1. Repeated description will be omitted.

Referring to FIG. 11, a wireless communication system 10c includes a beamformer device 100 and a beamformee device 200c. The beamformer device 100 may include a plurality of antennas 101. The beamformee device 200c may include a plurality of antennas 201, a channel estimator 210, a first beamforming matrix provider 220c, a dimension reduction unit 230 and a second beamforming matrix provider 240c.

FIG. 11 illustrates an example where the codebook utilization scheme is applied to both the plurality of wideband beamforming matrices WBM and the plurality of subcarrier beamforming matrices SBM, and thus configurations of the first and second beamforming matrix providers 220c and 240c may be changed. The beamformer device 100, the plurality of antennas 101 and 201, the channel estimator 210 and the dimension reduction unit 230 may be substantially the same as those described with reference to FIGS. 1 and 3.

The first beamforming matrix provider 220c may be substantially the same as the first beamforming matrix provider 220a in FIG. 6, and may include a first storage unit 222 and a first selector 224. The second beamforming matrix provider 240c may be substantially the same as the second beamforming matrix provider 240b in FIG. 9, and may include a second storage unit 246 and a second selector 248.

A beamforming feedback report that is generated based on the plurality of wideband beamforming matrices WBM provided from the first beamforming matrix provider 220c and the plurality of subcarrier beamforming matrices SBM provided from the second beamforming matrix provider 240c may include MAC header information, category information, MIMO control information, first codebook index information corresponding to the codebook index information 274a in FIG. 7, second codebook index information corresponding to the codebook index information 274b in FIG. 10, and feedback mode information.

Referring to FIG. 12, a wireless communication system 10d includes a beamformer device 100 and a beamformee device 200d. The beamformer device 100 may include a plurality of antennas 101. The beamformee device 200d may include a plurality of antennas 201, a channel estimator 210, a first beamforming matrix provider 220d, a dimension reduction unit 230, a second beamforming matrix provider 240d and a feedback mode selector 280.

FIG. 12 illustrates an example where the codebook utilization scheme is selectively and/or adaptively applied to at least one of the plurality of wideband beamforming matrices WBM and the plurality of subcarrier beamforming matrices SBM, and thus the beamformee device 200d may further include the feedback mode selector 280 and configurations of the first and second beamforming matrix providers 220d and 240d may be changed. The beamformer device 100, the plurality of antennas 101 and 201, the channel estimator 210 and the dimension reduction unit 230 may be substantially the same as those described with reference to FIGS. 1 and 3.

The beamformee device 200d may operate in one of the first feedback mode, the second feedback mode and the third feedback mode. In the first feedback mode, one of the plurality of first codebooks 221 may be selected, and the selected first codebook may be output as one of the plurality of wideband beamforming matrices WBM. In the second feedback mode, one of the plurality of second codebooks 241 may be selected, and the selected second codebook may be output as one of the plurality of subcarrier beamforming matrices SBM. In the third feedback mode, one of the plurality of first codebooks 221 may be selected, one of the plurality of second codebooks 241 may be selected, and the selected first codebook and the selected second codebook may be output as one of the plurality of wideband beamforming matrices WBM and as one of the plurality of subcarrier beamforming matrices SBM, respectively.

For selecting and/or changing the feedback mode, the first beamforming matrix provider 220d may include a first processing unit (PU1) 2202 and a second processing unit (PU2) 2204, and the second beamforming matrix provider 240d may include a third processing unit (PU3) 2402 and a fourth processing unit (PU4) 2404. The first processing unit 2202 and the second processing unit 2204 may have configurations substantially the same as those of the first beamforming matrix provider 220a in FIG. 6 and the first beamforming matrix provider 220b in FIG. 9, respectively. The third processing unit 2402 and the fourth processing unit 2404 may have configurations substantially the same as those of the second beamforming matrix provider 240b in FIG. 9 and the second beamforming matrix provider 240a in FIG. 6, respectively.

The feedback mode selector 280 may select one of the first feedback mode, the second feedback mode and the third feedback mode based on the characteristics of the channel, and may generate a mode signal MD representing the selected feedback mode. For example, the selected feedback mode may be a feedback mode that is predicted to have the largest amount of data transmission.

In some example embodiments, one of the first and second processing units 2202 and 2204 may be enabled or activated, and one of the third and fourth processing units 2402 and 2404 may be enabled or activated, depending on the feedback mode (e.g., based on the mode signal MD). For example, the first processing unit 2202 may be enabled in the first and third feedback modes, and the second processing unit 2204 may be enabled in the second feedback mode. In addition, the third processing unit 2402 may be enabled in the second and third feedback modes, and the fourth processing unit 2404 may be enabled in the first feedback mode.

Figure 13:
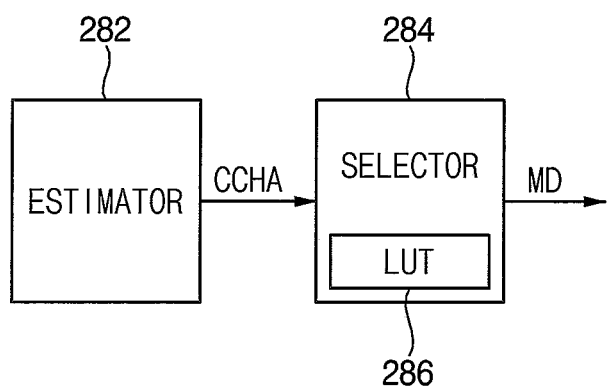
FIG. 13 is a block diagram illustrating a feedback mode selector included in a beamformee device according to example embodiments.

FIG. 13 is a block diagram illustrating an example of a feedback mode selector included in a beamformee device of FIG. 12.

Referring to FIG. 13, a feedback mode selector 280a may include an estimator 282 and a selector 284.

The estimator 282 may estimate the characteristic of the channel, and may generate a characteristic signal CCHA representing the estimated characteristic of the channel. For example, the characteristic of the channel may include at least one of a signal-to-noise ratio (SNR), a modulation and coding scheme (MCS), a physical data unit (PDU) length, a bandwidth (BW), the number of spatial stream (Nss), and an encoding scheme including a binary convolution coding (BCC) and a low density parity check (LDPC).

The selector 284 may select one of the feedback modes based on the characteristic of the channel (e.g., based on the characteristic signal CCHA), and may generate the mode signal MD.

In some example embodiments, the selector 284 may include a look-up table (LUT) 286 that is preset or predetermined. For example, the look-up table 286 may represent a relationship between the estimated characteristic of the channel and the feedback mode.

FIG. 14 is a diagram illustrating an example of a look-up table that may be included in the feedback mode selector of FIG. 13.

Referring to FIG. 14, an example of the look-up table 286 in which the SNR and the MCS are used as the characteristics of the channel is illustrated.

In an example of FIG. 14, the look-up table 286 may include M different MCS cases for each SNR and data rates in the first, second and third feedback modes for each MCS.

For example, for a first SNR SNR_1 and first through M-th MCSs MCS_1, MCS_2, . . . , MCS_M, the look-up table 286 may include data rates RATE_1_1_1, RATE_1_2_1, . . . , RATE_1_M_1 in the first feedback mode, data rates RATE_1_1_2, RATE_1_2_2, . . . , RATE_1_M_2 in the second feedback mode, and data rates RATE_1_1_3, RATE_1_2_3, . . . , RATE_1_M_3 in the third feedback mode. Similarly, for a second SNR SNR_2 and the first through M-th MCSs MCS_1, MCS_2, . . . , MCS_M, the look-up table 286 may include data rates RATE_2_1_1, RATE_2_2_1, . . . , RATE_2_M_1 in the first feedback mode, data rates RATE_2_1_2, RATE_2_2_2, . . . , RATE_2_M_2 in the second feedback mode, and data rates RATE_2_1_3, RATE_2_2_3, . . . , RATE_2_M_3 in the third feedback mode. For a K-th SNR SNR_K and the first through M-th MCSs MCS_1, MCS_2, . . . , MCS_M, the look-up table 286 may include data rates RATE_K_1_1, RATE_K_2_1, . . . , RATE_K_M_1 in the first feedback mode, data rates RATE_K_1_2, RATE_K_2_2, . . . , RATE_K_M_2 in the second feedback mode, and data rates RATE_K_1_3, RATE_K_2_3, . . . , RATE_K_M_3 in the third feedback mode.

When a SNR estimated by the estimator 282 is greater than SNR_m and less than or equal to SNR (m+1) among the SNRs SNR_1 to SNR_K, the SNR_m may be selected, and a corresponding MCS may be selected from among the MCSs MCS_1 to MCS_M. Among the data rates corresponding to the selected SNR and the selected MCS, a feedback mode corresponding to the largest data rate (e.g., the amount of data transmission amount is predicted to be the largest) may be selected.

Figure 15:
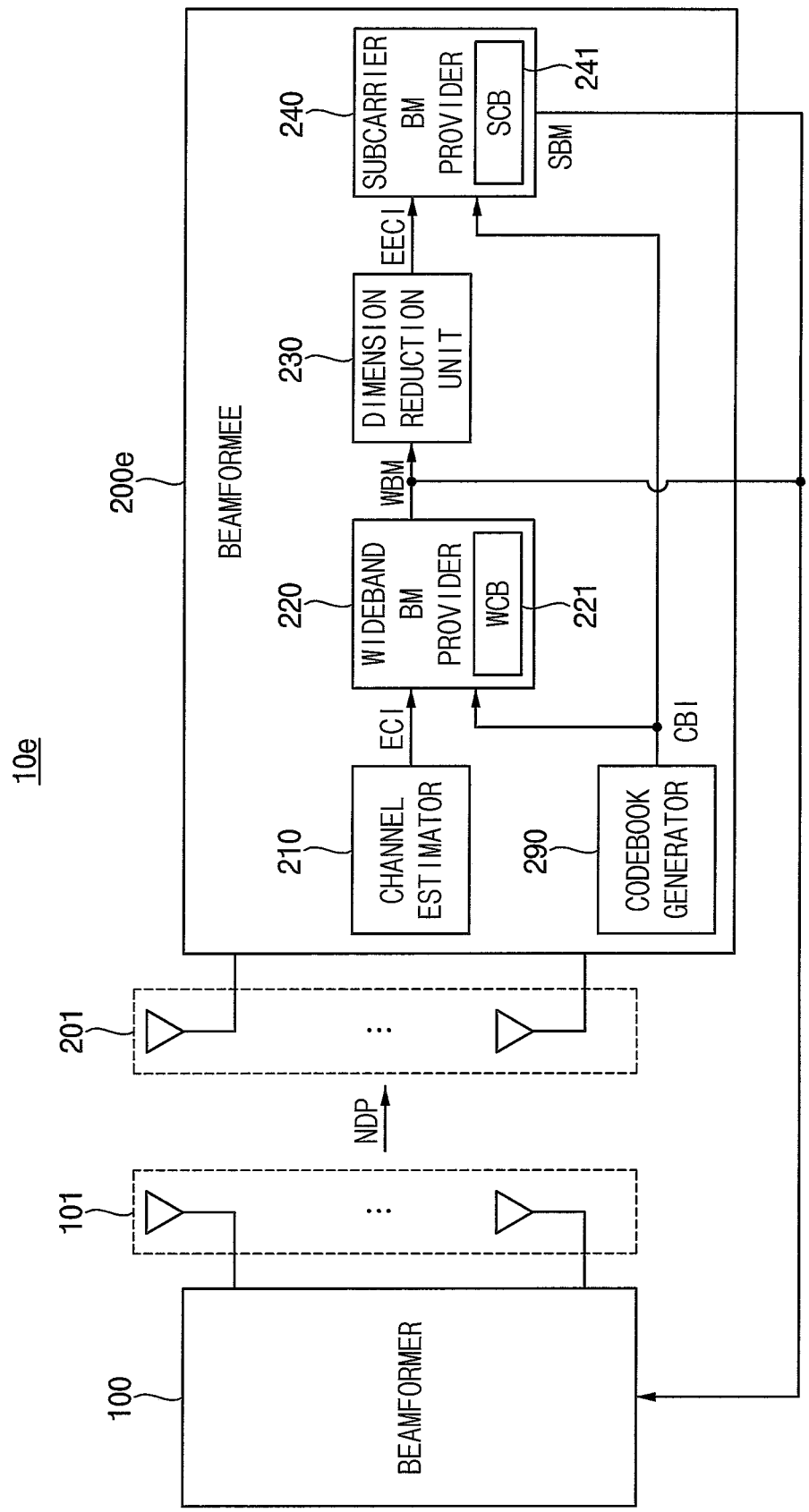
FIG. 15 is a block diagram illustrating a beamformee device and a wireless communication system according to example embodiments.

FIG. 15 is a block diagram illustrating another example of a beamformee device and a wireless communication system of FIG. 1. Repeated description will be omitted.

Referring to FIG. 15, a wireless communication system 10e includes a beamformer device 100 and a beamformee device 200e. The beamformer device 100 may include a plurality of antennas 101. The beamformee device 200e may include a plurality of antennas 201, a channel estimator 210, a first beamforming matrix provider 220, a dimension reduction unit 230, a second beamforming matrix provider 240 and a codebook generator 290.

FIG. 15 illustrates an example where the beamformee device 200e further includes the codebook generator 290. The beamformer device 100, the plurality of antennas 101 and 201, the channel estimator 210, the first beamforming matrix provider 220, the dimension reduction unit 230 and the second beamforming matrix provider 240 may be substantially the same as those described with reference to FIGS. 1 and 3.

The codebook generator 290 may design the plurality of first codebooks 221 and/or the plurality of second codebooks 241, and may generate codebook information CBI representing the designed codebooks. For example, the codebook generator 290 may design the codebooks based on the Lloyd algorithm described with reference to FIGS. 4A, 4B, 4C, 4D and 5. The codebook information CBI may be provided to the first and second beamforming matrix providers 220 and 240.

The first and second beamforming matrix providers 220 and 240 may be implemented as described with reference to FIGS. 6, 9, 11 and 12.

In some example embodiments, at least a part of the elements or components included in the beamformee device according to example embodiments may be implemented as hardware. For example, at least a part of the elements or components included in the beamformee device may be included in a computer-based electronic system. In other example embodiments, at least a part of the elements or components included in the beamformee device according to example embodiments may be implemented as instruction codes or program routines (e.g., a software program). For example, the instruction codes or the program routines may be executed by a computer-based electronic system, and may be stored in any storage device located inside or outside the computer-based electronic system.

In the beamformee device and the wireless communication system according to example embodiments, the dual beamforming feedback may be used when the beamforming feedback is performed in the feedback mode, and the codebook utilization scheme may be applied to at least one of the plurality of wideband beamforming matrices WBM and the plurality of subcarrier beamforming matrices SBM. In addition, the adaptive codebook utilization scheme in which the feedback mode is selected and/or changed depending on the condition and/or environment of the channel may be implemented. Accordingly, the feedback overhead of the beamforming feedback may be efficiently reduced, and beamforming feedback may be performed with improved efficiency.

Figure 16:
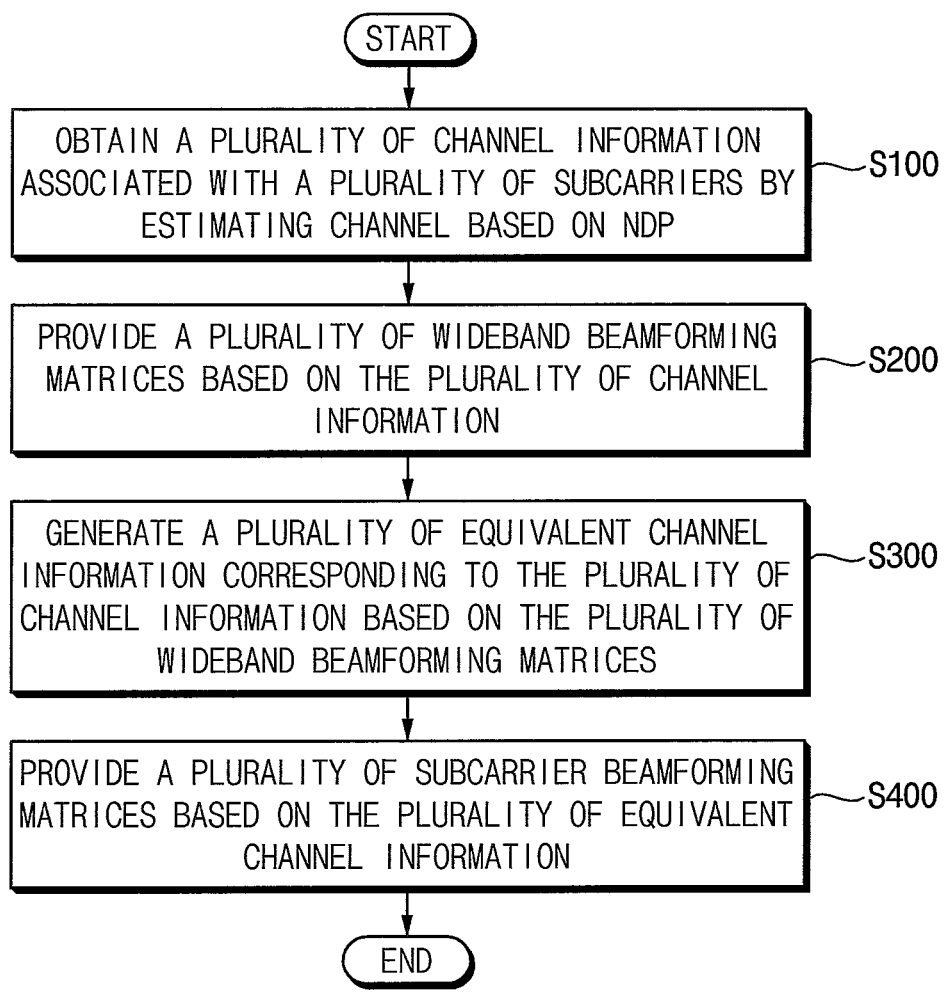
FIGS. 16, 17 and 18 are flowcharts illustrating beamforming feedback methods according to example embodiments.
Figure 17:
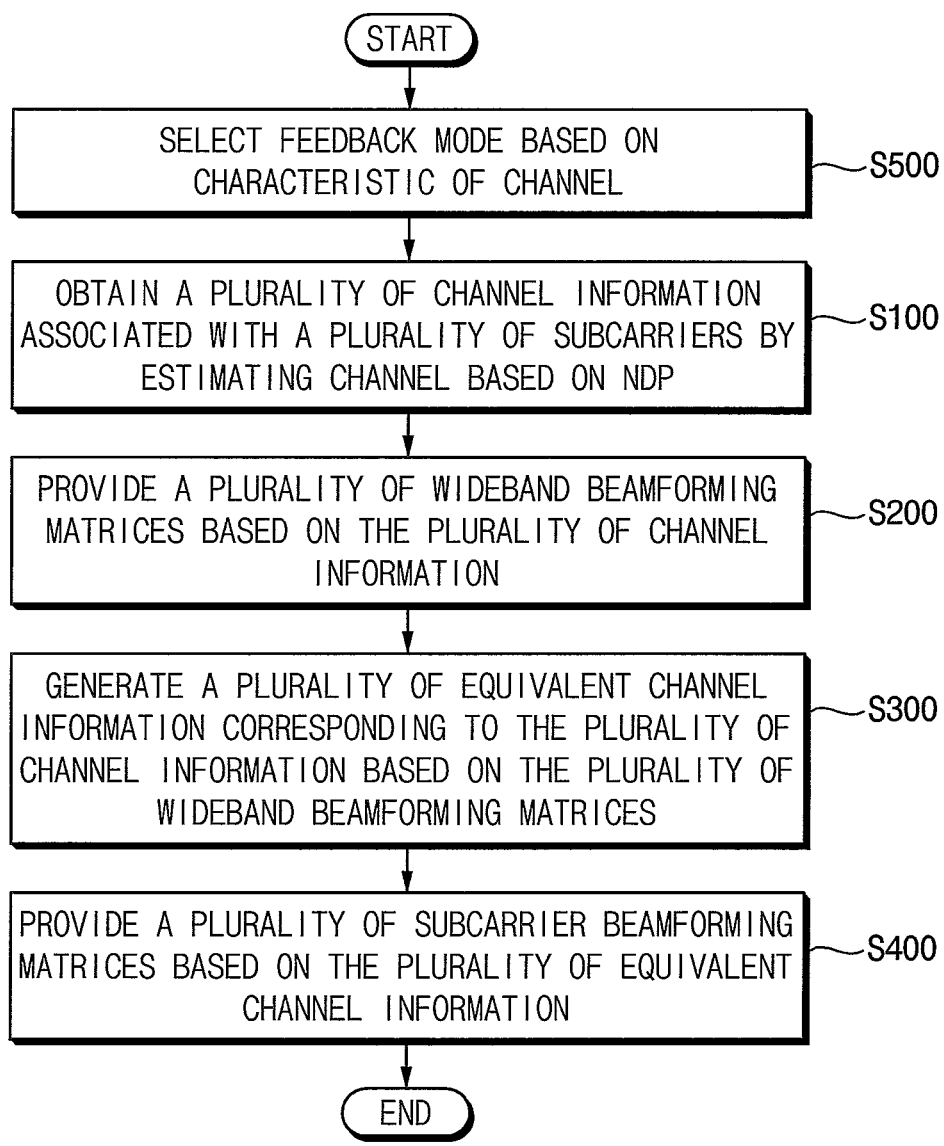
Figure 18:
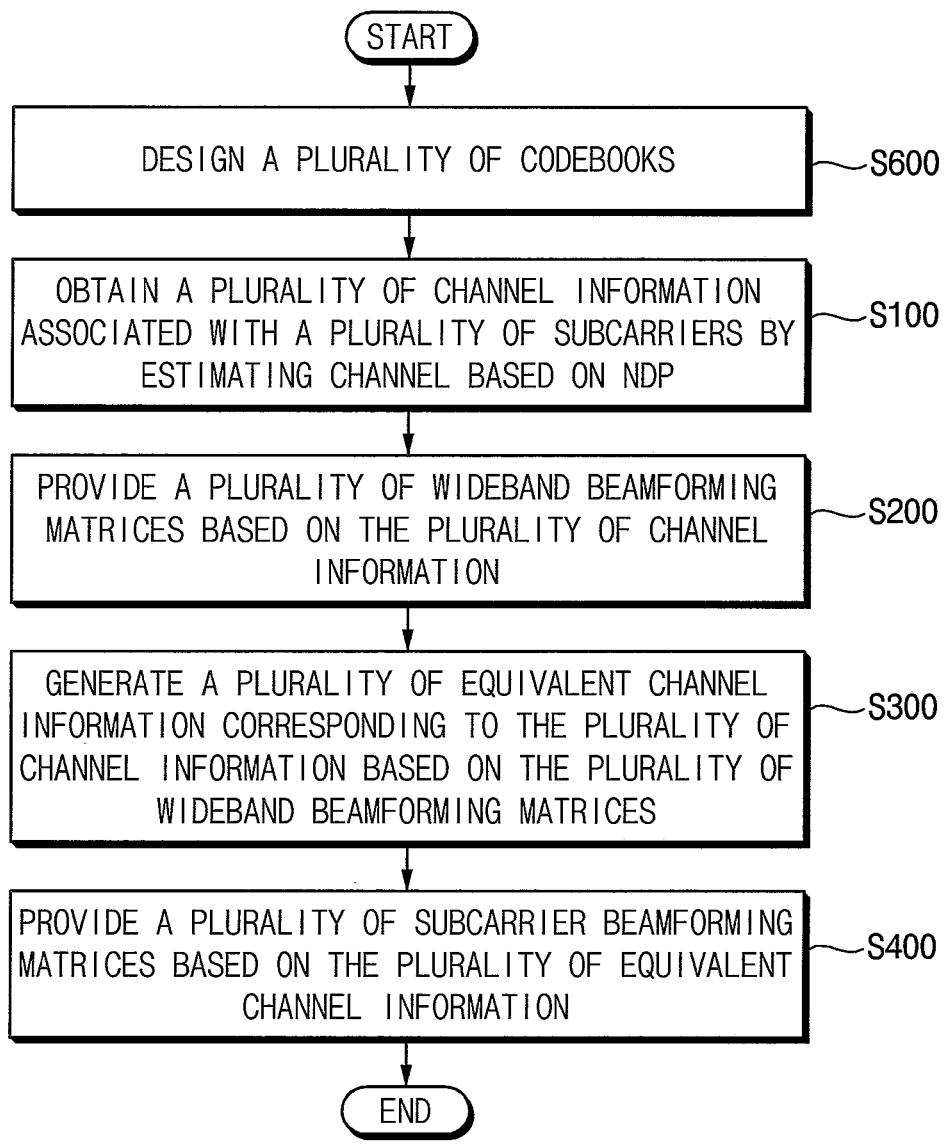

FIGS. 16, 17 and 18 are flowcharts illustrating a beamforming feedback method according to example embodiments.

Referring to FIG. 16, a beamforming feedback method according to example embodiments may be performed by a wireless communication system including a beamformer device and a beamformee device. For example, the beamforming feedback method according to example embodiments may be performed by the beamformee device. The wireless communication system and the beamformee device may be implemented as described with reference to FIGS. 1 through 15.

In the beamforming feedback method according to example embodiments, a plurality of channel information associated with a plurality of subcarriers are obtained by estimating a channel based on a NDP that is received from the beamformer device through the channel (operation S100). For example, operation S100 may be performed by the channel estimator 210 in FIG. 1.

A plurality of wideband beamforming matrices are provided based on the plurality of channel information (operation S200). For example, operation S200 may be performed by the first beamforming matrix provider 220 in FIG. 1.

In some example embodiments, when performing operation S200, one of a plurality of first codebooks that are pre-designed may be selected based on the plurality of channel information, and the selected first codebook may be output as one of the plurality of wideband beamforming matrices. For example, based on the plurality of channel information, one of the plurality of first codebooks may be selected as one of the plurality of wideband beamforming matrices, and the selected first codebook may be used to maximize the power of the channel. For example, one of the plurality of wideband beamforming matrices may be selected based on Equation 16 described with reference to FIG. 6.

A plurality of equivalent channel information corresponding to the plurality of channel information are generated based on the plurality of wideband beamforming matrices (operation S300). For example, operation S300 may be performed by the dimension reduction unit 230 in FIG. 1.

A plurality of subcarrier beamforming matrices are provided based on the plurality of equivalent channel information (operation S400). For example, operation S400 may be performed by the second beamforming matrix provider 240 in FIG. 1.

In some example embodiments, when performing operation S400, one of a plurality of second codebooks that are pre-designed may be selected based on the plurality of equivalent channel information, and the selected second codebook may be output as one of the plurality of subcarrier beamforming matrices. For example, based on the plurality of equivalent channel information, one of the plurality of second codebooks may be selected as one of the plurality of subcarrier beamforming matrices, and the selected second codebook may be selected because it is closest to the plurality of equivalent channel information. For example, one of the plurality of subcarrier beamforming matrices may be selected based on Equation 17 described with reference to FIG. 9.

The plurality of wideband beamforming matrices and the plurality of subcarrier beamforming matrices are fed back to the beamformer device. For example, the plurality of wideband beamforming matrices and the plurality of subcarrier beamforming matrices may be fed back to the beamformer device in the form of a beamforming feedback report.

At least one of the plurality of wideband beamforming matrices and the plurality of subcarrier beamforming matrices are selected from a plurality of codebooks that are pre-designed. For example, as described with reference to FIGS. 6, 9 and 11, the codebook utilization scheme may be applied only to the plurality of wideband beamforming matrices WBM, the codebook utilization scheme may be applied only to the plurality of subcarrier beamforming matrices SBM, or the codebook utilization scheme may be applied to both the plurality of wideband beamforming matrices WBM and the plurality of subcarrier beamforming matrices SBM.

Referring to FIG. 17, in a beamforming feedback method according to example embodiments. Repeated description will be omitted.

A feedback mode of the beamformee device is selected based on a characteristic of the channel (operation S500). For example, as described with reference to FIG. 12, one of the first feedback mode, the second feedback mode and the third feedback mode may be selected based on the characteristic of the channel, and the selected feedback mode may be a feedback mode that is predicted to have the largest amount of data transmission. For example, operation S500 may be performed by the feedback mode selector 280 in FIG. 12.

Operations S100, S200, S300 and S400 subsequent to operation S500 may be substantially the same as those described with reference to FIG. 16.

Referring to FIG. 18, in a beamforming feedback method according to example embodiments. Repeated description will be omitted.

The plurality of codebooks are designed (operation S600). For example, as described with reference to FIGS. 4A, 4B, 4C, 4D and 5, the plurality of codebooks may be designed based on the Lloyd algorithm. For example, operation S600 may be performed once at the time of manufacture and/or at the initial operation time of the beamforming device, and may be omitted thereafter. For example, operation S600 may be performed by the codebook generator 290 in FIG. 15.

Operations S100, S200, S300 and S400 subsequent to operation S600 may be substantially the same as those described with reference to FIG. 16.

In some example embodiments, operation S600 may be additionally performed in the example of FIG. 17.

As will be appreciated by those skilled in the art, example embodiments may be implemented as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 19:
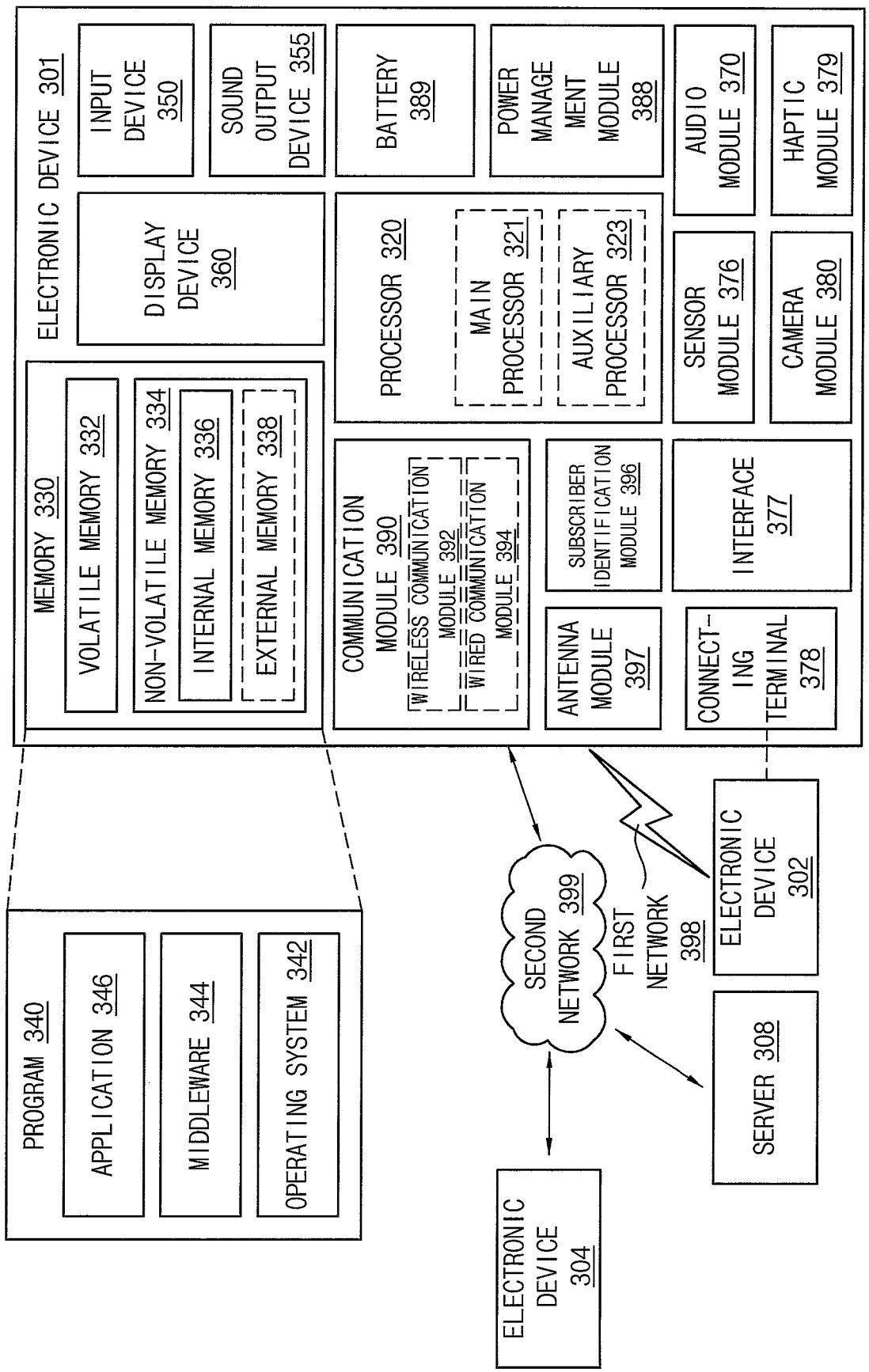
FIG. 19 is a block diagram illustrating an electronic device in a network environment according to example embodiments.

FIG. 19 is a block diagram illustrating an electronic device in a network environment according to example embodiments.

Referring to FIG. 19, an electronic device 301 in a network environment 300 may communicate with an electronic device 302 via a first network 398 (e.g., a short-range wireless communication network), or an electronic device 304 or a server 308 via a second network 399 (e.g., a long-range wireless communication network). In some example embodiments, the electronic device 301 may communicate with the electronic device 304 via the server 308. In some example embodiments, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, and/or an antenna module 397.

The processor 320 may execute, for example, software (e.g., a program 340) to control at least one other component (e.g., a hardware or software component) of the electronic device 301 coupled with the processor 320, and may perform various data processing or computation. In some example embodiments, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321.

The memory 330 may store various data used by at least one component (e.g., the processor 320 or the sensor module 376) of the electronic device 301. The various data may include, for example, software (e.g., the program 340) and input data or output data for a command related thereto. The memory 330 may include a volatile memory 332 or a nonvolatile memory 334.

The program 340 may be stored in the memory 330 as software, and may include, for example, an operating system (OS) 342, middleware 344, and/or an application 346.

The input device 350 may receive a command or data to be used by another component (e.g., the processor 320) of the electronic device 301, from the outside (e.g., a user) of the electronic device 301. The sound output device 355 may output sound signals to the outside of the electronic device 301. The display device 360 may visually provide information to the outside (e.g., to a user) of the electronic device 301.

The audio module 370 may convert a sound into an electrical signal and vice versa. The sensor module 376 may detect an operational state (e.g., power or temperature) of the electronic device 301 or an environmental state (e.g., a state of a user) external to the electronic device 301, and then generate an electrical signal or data value corresponding to the detected state. The interface 377 may support one or more specified protocols to be used to couple the electronic device 301 with the external electronic device (e.g., the electronic device 302) directly (e.g., wired) or wirelessly.

A connecting terminal 378 may include a connector via which the electronic device 301 may be physically connected with the external electronic device (e.g., the electronic device 302). The haptic module 379 may convert an electrical signal into a mechanical stimulus (e.g., a vibration or a movement) or electrical stimulus which may be recognized by a user via his tactile sensation or kinesthetic sensation. The camera module 380 may capture a still image or moving images.

The power management module 388 may manage power supplied to other components of the electronic device 301. In some example embodiments, the power management module 388 may be implemented as at least part of, for example, a power management integrated circuit (PMIC). The battery 389 may supply power to at least one component of the electronic device 301.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. In some example embodiments, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module).

In some example embodiments, the wireless communication module 392 included in the communication module 390 may include the beamformer device and the beamformee device according to example embodiments, and may be implemented to perform the beamforming feedback method according to example embodiments. For example, the wireless communication module 392 included in the electronic device 301 may include the beamformee device (e.g., the beamformee device 200 in FIG. 1) according to example embodiments, a wireless communication module included in the electronic device 304 may include the beamformer device (e.g., the beamformer device 100 in FIG. 1), and the second network 399 formed between the electronic devices 301 and 304 may correspond to the channel between the beamformee device and the beamformer device. The beamformee device included in the electronic device 301 may communicate with the beamformer device included in the electronic device 304, and may operate based on the codebook utilization scheme and/or the adaptive codebook utilization scheme according to example embodiments while performing the dual beamforming feedback. Similarly, the beamformee device included in the electronic device 304 may communicate with the beamformer device included in the electronic device 301, and may operate based on the codebook utilization scheme and/or the adaptive codebook utilization scheme according to example embodiments while performing the dual beamforming feedback.

The antenna module 397 may transmit or receive a signal or power to or from the outside (e.g., the external electronic device) of the electronic device 301.

Example embodiments may be applied to various communication devices and systems that perform the beamforming and various electronic devices and systems that include the communication devices and systems. For example, example embodiments may be applied to systems such as a personal computer (PC), a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A beamformee device comprising:
   a processor configured to implement:
      a channel estimator configured to receive a null data packet (NDP) from a beamformer device through a channel, and to obtain a plurality of channel information associated with a plurality of subcarriers of the channel based on the NDP;
      a first beamforming matrix provider configured to provide a plurality of wideband beamforming matrices based on the plurality of channel information;

a dimension reduction unit configured to generate a plurality of equivalent channel information corresponding to the plurality of channel information based on the plurality of wideband beamforming matrices; and a second beamforming matrix provider configured to provide a plurality of subcarrier beamforming matrices based on the plurality of equivalent channel information, wherein the processor is further configured to feed the plurality of wideband beamforming matrices and the plurality of subcarrier beamforming matrices back to the beamformer device, and wherein any one or any combination of the plurality of wideband beamforming matrices and the plurality of subcarrier beamforming matrices are selected from a plurality of codebooks that are stored in the beamformee device.

2. The beamformee device of claim 1, wherein the first beamforming matrix provider is configured to select one of a plurality of first codebooks as a selected first codebook based on the plurality of channel information, and to output the selected first codebook as one of the plurality of wideband beamforming matrices.

3. The beamformee device of claim 2, further comprising a first storage configured to store the plurality of first codebooks, wherein the processor is further configured to implement a first selector configured to select the selected first codebook to maximize a power of the channel.

4. The beamformee device of claim 3, wherein the first selector is configured to select the selected first codebook based on Equation 1 as follows:

$$W_w = \arg\max_{W_i \in \mathbb{C}} \frac{1}{N_g} \sum_{k=0}^{N_g-1} \|H^H[k]H[k]W_i\| \quad \text{[Equation 1]}$$

wherein in Equation 1, Ww denotes a selected wideband beamforming matrix, Ng denotes a number of subcarriers corresponding to one wideband beam, H[k] denotes a channel matrix corresponding to one of the plurality of channel information, HH[k] denotes a conjugate transpose matrix of H[k], Wi denotes an i-th codebook among the plurality of first codebooks, and k denotes an index of the plurality of subcarriers.

5. The beamformee device of claim 3, wherein the processor is further configured to generate a beamforming feedback report based on the plurality of wideband beamforming matrices and the plurality of subcarrier beamforming matrices and control the beamformee device to feed the beamforming feedback report back to the beamformer device, and wherein the beamforming feedback report comprises media access control (MAC) header information, category information, multiple-input multiple-output (MIMO) control information, codebook index information corresponding to the plurality of wideband beamforming matrices, compressed beamforming report (CBR) information corresponding to the plurality of subcarrier beamforming matrices, additional common phase information, and feedback mode information.

6. The beamformee device of claim 3, wherein the processor is further configured to implement:
a singular value decomposition (SVD) unit configured to perform an SVD on the plurality of equivalent channel information; and
a compression unit configured to compress an output of the SVD unit.

7. The beamformee device of claim 1, wherein the second beamforming matrix provider is further configured to select one of a plurality of second codebooks as a selected second codebook based on the plurality of equivalent channel information, and to output the selected second codebook as one of the plurality of subcarrier beamforming matrices.

8. The beamformee device of claim 7, further comprising a second storage configured to store the plurality of second codebooks, wherein the processor is further configured to implement a second selector configured to select the selected second codebook as closest to the plurality of equivalent channel information.

9. The beamformee device of claim 8, wherein the second selector is configured to select the selected second codebook based on Equation 2 as follows:

$$W_s = \arg\min_{W_i \in \mathbb{C}} \frac{1}{N_g} \sum_{k=0}^{N_g-1} ED(V_{sc}[k], W_i) \quad \text{[Equation 2]}$$

wherein in Equation 2, Ws denotes a selected subcarrier beamforming matrix, Ng denotes a number of subcarriers corresponding to one wideband beam, ED(•) denotes an Euclidean distance function, Vsc[k] denotes a unitary matrix for a channel matrix corresponding to one of the plurality of equivalent channel information, Wi denotes an i-th codebook among the plurality of second codebooks, k denotes an index of the plurality of subcarriers.

10. The beamformee device of claim 8, wherein the processor is further configured to generate a beamforming feedback report based on the plurality of wideband beamforming matrices and the plurality of subcarrier beamforming matrices, and control the beamformee device to feed the beamforming feedback report back to the beamformer device, and wherein the beamforming feedback report comprises MAC header information, category information, MIMO control information, codebook index information corresponding to the plurality of subcarrier beamforming matrices, CBR information corresponding to the plurality of wideband beamforming matrices, and feedback mode information.

11. The beamformee device of claim 8, wherein the processor is further configured to implement:
a covariance calculator configured to identify a covariance matrix based on the plurality of channel information;
a SVD unit configured to perform an SVD on an output of the covariance calculator; and
a compression unit configured to compress an output of the SVD unit.

12. The beamformee device of claim 1, wherein:
the first beamforming matrix provider is further configured to select one of a plurality of first codebooks as a selected first codebook based on the plurality of channel information, and to output the selected first codebook as one of the plurality of wideband beamforming matrices, and the second beamforming matrix provider is further configured to select one of a plurality of second codebooks as a selected second codebook based on the plurality of equivalent channel information, and to output the selected second codebook as one of the plurality of subcarrier beamforming matrices.

13. The beamformee device of claim 1, wherein the beamformee device is configured to operate in a first feedback mode, a second feedback mode and a third feedback mode,
wherein in the first feedback mode one of a plurality of first codebooks is selected as a selected first codebook and output as one of the plurality of wideband beamforming matrices,
wherein in the second feedback mode one of a plurality of second codebooks is selected as a selected second codebook and output as one of the plurality of subcarrier beamforming matrices, and
wherein in the third feedback mode one of the plurality of first codebooks is selected as the selected first codebook and output as one of the plurality of wideband beamforming matrices, and one of the plurality of second codebooks is selected as the selected second codebook and output as one of the plurality of subcarrier beamforming matrices.

14. The beamformee device of claim 13, wherein the processor is further configured to implement a feedback mode selector configured to select one of the first feedback mode, the second feedback mode and the third feedback mode as a selected feedback mode based on a characteristic of the channel, the selected feedback mode being predicted to have a largest amount of data transmission.

15. The beamformee device of claim 14, wherein the characteristic of the channel indicates any one or any combination of a signal-to-noise ratio (SNR), a modulation and coding scheme (MCS), a physical data unit (PDU) length, a bandwidth (BW), a number of spatial stream (Nss), and an encoding scheme including a binary convolution coding (BCC) and a low density parity check (LDPC).

16. The beamformee device of claim 1, wherein the processor is further configured to implement a codebook generator configured to generate the plurality of codebooks.

17. The beamformee device of claim 16, wherein the codebook generator is configured to generate the plurality of codebooks by performing Lloyd algorithm using a discrete-time Fourier transform (DFT) codebook as an initial value.

18. The beamformee device of claim 1, wherein the beamformee device is included in a wireless communication system based on a wireless local area network (WLAN).

19. A beamformee device comprising:
a processor configured to implement:
a channel estimator configured to receive a null data packet (NDP) from a beamformer device through a channel, and to obtain a plurality of channel information associated with a plurality of subcarriers of the channel based on the NDP;
a feedback mode selector configured to select one of a first feedback mode, a second feedback mode or a third feedback mode as a selected feedback mode based on a characteristic of the channel;
a first beamforming matrix provider configured to generate a plurality of wideband beamforming matrices by performing a singular value decomposition (SVD) and compressing the plurality of channel information based on the selected feedback mode being the second feedback mode, and to select and output one of a plurality of first codebooks as a selected first codebook based on the plurality of channel information as one of the plurality of wideband beamforming matrices based on the selected feedback mode being the first feedback mode or the third feedback mode;
a dimension reduction unit configured to generate a plurality of equivalent channel information corresponding to the plurality of channel information based on the plurality of wideband beamforming matrices; and
a second beamforming matrix provider configured to generate a plurality of subcarrier beamforming matrices by performing an SVD and compressing the plurality of equivalent channel information based on the selected feedback mode being the first feedback mode, and to select and output one of a plurality of second codebooks as a selected second codebook based on the plurality of equivalent channel information as one of the plurality of subcarrier beamforming matrices based on the selected feedback mode being the second feedback mode or the third feedback mode,
wherein the processor is further configured to feed the plurality of wideband beamforming matrices and the plurality of subcarrier beamforming matrices back to the beamformer device, and
wherein a codebook index corresponding to the selected first codebook and the selected second codebook is fed back to the beamformer device.

20. A beamforming feedback method comprising:
obtaining a plurality of channel information associated with a plurality of subcarriers of a channel based on a null data packet (NDP) that is received from a beamformer device through the channel;
providing a plurality of wideband beamforming matrices based on the plurality of channel information;
generating a plurality of equivalent channel information corresponding to the plurality of channel information based on the plurality of wideband beamforming matrices;
providing a plurality of subcarrier beamforming matrices based on the plurality of equivalent channel information; and
feeding the plurality of wideband beamforming matrices and the plurality of subcarrier beamforming matrices back to the beamformer device,
wherein any one or any combination of the plurality of wideband beamforming matrices and the plurality of subcarrier beamforming matrices are selected from a plurality of codebooks that are stored in memory.

* * * * *